(12) United States Patent
Garcia Martin

(10) Patent No.: US 12,052,657 B2
(45) Date of Patent: Jul. 30, 2024

(54) AMF NODE, NSSF NODE, TARGET SMF NODE AND METHODS PERFORMED IN A COMMUNICATIONS NETWORK

(71) Applicant: Sago Strategic Solutions LLC, Wilmington, DE (US)

(72) Inventor: Miguel Angel Garcia Martin, Pozuelo de Alarcon (ES)

(73) Assignee: SAGO STRATEGIC SOLUTIONS LLC, Wilmington, DE (US)

( * ) Notice: Subject to any disclaimer, the term of this patent is extended or adjusted under 35 U.S.C. 154(b) by 319 days.

(21) Appl. No.: 17/426,918

(22) PCT Filed: Mar. 12, 2019

(86) PCT No.: PCT/EP2019/056125
§ 371 (c)(1),
(2) Date: Jul. 29, 2021

(87) PCT Pub. No.: WO2020/164747
PCT Pub. Date: Aug. 20, 2020

(65) Prior Publication Data
US 2022/0104114 A1    Mar. 31, 2022

(30) Foreign Application Priority Data
Feb. 12, 2019   (EP) .................... 19382097

(51) Int. Cl.
*H04W 76/00*   (2018.01)
*H04W 36/14*   (2009.01)
(Continued)

(52) U.S. Cl.
CPC .......... *H04W 48/18* (2013.01); *H04W 36/14* (2013.01); *H04W 36/22* (2013.01); *H04W 76/12* (2018.02)

(58) Field of Classification Search
CPC ............. H04W 28/02; H04W 28/0247; H04W 28/0284; H04W 28/08; H04W 36/00;
(Continued)

(56) References Cited

U.S. PATENT DOCUMENTS 10,855,851 B2 *  12/2020  Qiao ..................... H04W 76/25
11,032,214 B2 *   6/2021  Sun ....................... H04L 47/827
(Continued)

FOREIGN PATENT DOCUMENTS

WO       2018 206080 A1    11/2018

OTHER PUBLICATIONS

3GPP TR 23.740 v16.0.0; Technical Report; 3rd Generation Partnership Project; Technical Specification Group Services and System Aspects; Study on Enhancement of Network Slicing (Release 16)—Dec. 2018.
(Continued)

*Primary Examiner* — Frank Duong
(74) *Attorney, Agent, or Firm* — Thorpe North & Western LLP

(57) ABSTRACT

A method performed by an Access and mobility Management Function (AMF) node for allocating a target network slice instance to serve a (PDU) session for a User Equipment (UE). The AMF node receives (501), from a Network Slice Selection Function (NSSF) node, information about a decision to change an allocation of a first network slice instance that is serving the PDU session to the target network slice instance, and an identifier of the target network slice instance. The AMF node then retrieves (502), from a first Session Management Function (SMF) node of the first network slice instance, a UE context related to the UE and the PDU session. The AMF node transmits (504), towards a target SMF node of the target network slice instance, information about the retrieved UE context and Access Network
(Continued)

(AN) tunnel information to be used for the PDU session. The AMF node receives (505), from the target SMF node, target Core Network (CN) tunnel information to be used for the PDU session. The AMF node then allocates the target network slice instance to route data flows pertaining to the PDU session by transmitting (500), towards an AN node, the target CN tunnel information to be used for the PDU session Publ.

23 Claims, 15 Drawing Sheets

(51) Int. Cl.
*H04W 36/22* (2009.01)
*H04W 48/18* (2009.01)
*H04W 76/12* (2018.01)

(58) Field of Classification Search
CPC ..... H04W 36/14; H04W 36/22; H04W 48/18; H04W 76/00; H04W 76/10; H04W 76/12
See application file for complete search history.

(56) References Cited

U.S. PATENT DOCUMENTS

| | | | | |
|---|---|---|---|---|
| 11,395,220 | B2* | 7/2022 | Li | H04L 41/0894 |
| 11,405,803 | B2* | 8/2022 | Fiorese | H04L 41/0823 |
| 11,606,727 | B2* | 3/2023 | Qiao | H04W 76/11 |
| 2017/0332421 | A1* | 11/2017 | Sternberg | H04L 41/0895 |
| 2019/0037636 | A1* | 1/2019 | Kim | H04W 60/00 |
| 2020/0100137 | A1* | 3/2020 | Panchal | H04W 48/18 |

OTHER PUBLICATIONS

3GPP TS 23.501 Draft v16.0.0+; Technical Specification; 3rd Generation Partnership Project; Technical Specification Group Services and System Aspects; System Architecture for the 5G System; Stage 2 (Release 16)—Feb. 2019.

3GPP TS 23.501 v15.4.0; Technical Specification; 3rd Generation Partnership Project; Technical Specification Group Services and System Aspects; System Architecture for the 5G System; Stage 2 (Release 15)—Dec. 2018.

3GPP TS 23.502 Draft v16.0.0+; Technical Specification; 3rd Generation Partnership Project; Technical Specification Group Services and System Aspects; Procedures for the 5G System; Stage 2 (Release 16)—Feb. 2019.

3GPP TS 23.502 v15.4.0; Technical Specification; 3rd Generation Partnership Project; Technical Specification Group Services and System Aspects; Procedures for the 5G System; Stage 2 (Release 15)—Dec. 2018.

SA WG2 Meeting #118; Reno, Nevada, USA; Source: LG Electronics; Title: Interim agreements on the network slice re-selection (S2-166474, revision of S2-165615)—Nov. 14-18, 2016.

PCT International Search Report issued for International application No. PCT/EP2019/056125—Apr. 11, 2019.

PCT Written Opinion of the International Searching Authority issued for International application No. PCT/EP2019/056125—Apr. 11, 2019.

* cited by examiner

501. Receive, from NSSF node, information about decision to change allocation of first network slice instance that is serving the PDU session to the target network slice instance, and identifier of the target network slice instance.

502. Retrieve, from first SMF node of first network slice instance, UE context related to UE and the PDU session.

503. Select target SMF node of target network slice instance.

504. Transmit towards target SMF node of target network slice instance, the retrieved UE context and AN tunnel information to be used for PDU session.

505. Receive from target SMF node, target CN tunnel information to be used for PDU session.

506. Allocate target network slice instance to route data flows pertaining to PDU session by transmitting towards AN node, the target CN tunnel information to be used for PDU session.

507. Transmit response to NSSF node comprising acknowledgement of decision to change allocation of first network slice instance to target network slice instance.

Fig. 5

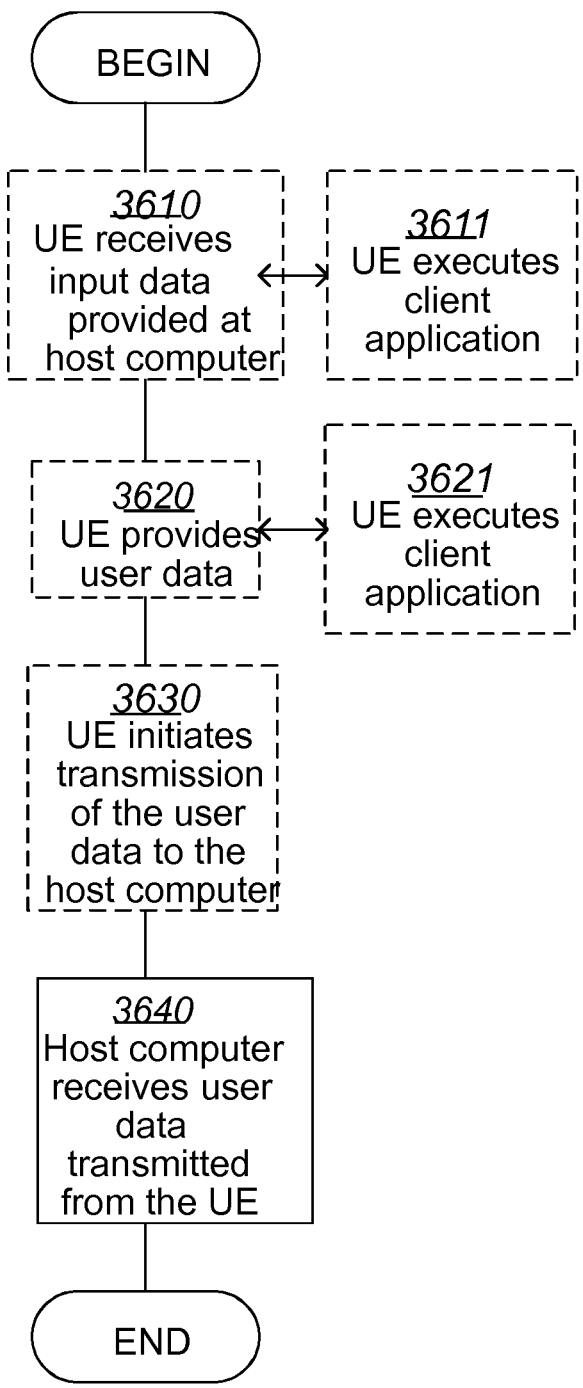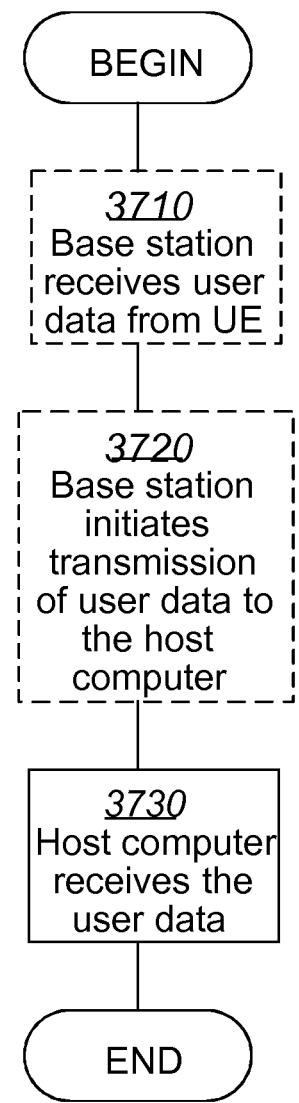
FIG. 15
FIG. 16

AMF NODE, NSSF NODE, TARGET SMF NODE AND METHODS PERFORMED IN A COMMUNICATIONS NETWORK

PRIORITY

This nonprovisional application is a U.S. National Stage Filing under 35 U.S.C. § 371 of International Patent Application Serial No. PCT/EP2019/056125 filed Mar. 12, 2019 and entitled "AMF NODE, NSSF NODE, TARGET SMF NODE AND METHODS PERFORMED IN A COMMUNICATIONS NETWORK" which claims priority to European Patent Application No. 19382097.4 filed Feb. 12, 2019 both of which are hereby incorporated by reference in their entirety.

TECHNICAL FIELD

Embodiments herein generally relate to an Access and mobility Management Function (AMF) node, a Network Slice Selection Function (NSSF) node, a target Session Management Function (SMF) node and methods therein. In particular, they relate to allocating a target network slice instance to serve a Protocol Data Unit (PDU) session for a User Equipment (UE) in a communications network.

BACKGROUND

In a typical wireless communication network, wireless devices, also known as wireless communication devices, mobile stations, stations (STA) and/or User Equipment (UE), communicate via a Local Area Network such as a WiFi network or a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a Wi-Fi access point or a radio base station (RBS), which in some networks may also be denoted, for example, a NodeB, eNodeB (eNB), or gNB as denoted in 5th Generation (5G). A service area or cell area is a geographical area where radio coverage is provided by the radio network node. The radio network node communicates over an air interface operating on radio frequencies with the wireless device within range of the radio network node. The radio network node communicates to the wireless device in DownLink (DL) and from the wireless device in UpLink (UL).

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to Radio Network Controllers (RNCs) used in 3rd Generation (3G) networks. In general, in E-UTRAN/LTE the functions of a 3G RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques may significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

In addition to faster peak Internet connection speeds, 5G planning aims at higher capacity than current 4G, allowing higher number of mobile broadband users per area unit, and allowing consumption of higher or unlimited data quantities in gigabyte per month and user. This would make it feasible for a large portion of the population to stream high-definition media many hours per day with their mobile devices, when out of reach of Wi-Fi hotspots. 5G research and development also aims at improved support of machine to machine communication, also known as the Internet of things, aiming at lower cost, lower battery consumption and lower latency than 4G equipment.

Network Slicing

3GPP specifies the 5G Core (5GC) architecture in specifications 3GPP TS 23.501 and 3GPP TS 23.502. 5GC develops the concept of network slicing, which is a mechanism for partitioning the 5GC into different separated logical networks of the 5GC, offering specialized dedicated 5GC services for a given business purpose in a resource-efficient manner.

3GPP defines network slicing in TS 23.501 as a logical network that provides specific network capabilities and network characteristics.

3GPP also provides a definition of a network slice instance as a set of network function instances and the required resources, e.g. compute, storage and networking resources, which form a deployed network slice.

In general, an operator has deployed several types of network slices, in order to cover different UE needs, such as, enhanced Mobile Broadband (eMBB), Massive Internet of Things (MIoT), or Ultra-Reliable and Low Latency Communications (URLLC). For each of these types of network slices, the operator typically deploys more than a single network slice instance, sometimes covering not exactly the same geographical area, sometimes deployed with equipment from different vendors, and sometimes deploying slightly different network functions that may optimize or control the data plane characteristics differently from one instance to another one, even when all these instances are of the same type.

As a consequence, several instances of the same type of network slice may be available, all of these instances fulfilling the requirements of the type of network slice, but each instance offering optimizations or additional characteristics over other instances of the same type of network slice.

The selection of a network slice instance takes place in two phases, according to 3GPP TS 23.501 and TS 23.502:

1. During UE registration, re-registration, or mobility registration update due to changing to a new tracking area outside the registration area of the UE:

In this procedure, the UE gets an Access and mobility Management Function (AMF) allocated to it. This AMF is able to select, at a later time, a network slice instance out of the allowed network slices that this UE is authorized to use.

2. At Protocol Data Unit (PDU) Session establishment:
In this procedure, the UE requests the establishment of a PDU session for routing IP packets through a requested network slice. The AMF then selects a SMF that is able to serve the requested network slice. The SMF selects a User Plane Function (UPF) that provides the connectivity to the requested Data Network through the requested network slice.

3GPP is currently studying enhancements to the 5G Core network slice mechanisms. A number of key issues are covered in 3GPP TR 23.740.

SUMMARY

As a part of developing embodiments herein a problem was identified by the inventors and will first be discussed.

Assume a case where a UE has already established a PDU session and 5G Core has allocated a network slice instance, according to the needs of the PDU session. Since not all the instances of the same type of network slices are equal, assume that 5G core has allocated a default network slice of the requested type, e.g., eMBB, MIoT, URLLC, for this UE. Assume that the UE starts consuming some type of data for which there is another optimized instance of network slice that would offer a substantial performance improvement. The performance improvement may e.g. be due to the existence of high-speed links towards the data centre of a contact provider, or due to the presence of a caching network function that provides cached content much faster that if retrieved from the far server, or even due to the presence of strong security functions that are protecting the UE or the network against malicious activities.

3GPP currently does not provide means for the UE to benefit from the extra performance or security functions offered by optimized network slice instances once the UE has established the PDU session and 5G core has allocated a network slice instance to this UE.

An object of embodiments herein is to overcome these drawbacks and improve the performance of a communications network using network slice instances.

According to an aspect of embodiments herein, the object is achieved by a method performed by an Access and mobility Management Function (AMF) node for allocating a target network slice instance to serve a Protocol Data Unit (PDU) session for a User Equipment (UE) in a communication network. The AMF node receives information from a NSSF node. The information is about a decision to change an allocation of a first network slice instance that is serving the PDU session for the UE to the target network slice instance, and an identifier of the target network slice instance. The AMF node then retrieves a UE context from a first SMF node of the first network slice instance. The UE context relates to the UE and the PDU session. The AMF node transmits, towards a target SMF node of the target network slice instance, information about the retrieved UE context and Access Network (AN) tunnel information to be used for the PDU session. The AMF node receives, from the target SMF node, target Core Network (CN) tunnel information to be used for the PDU session. The AMF node then allocates the target network slice instance to route data flows pertaining to the PDU session by transmitting, towards an AN node, the target CN tunnel information received from the target SMF node and to be used for the PDU session.

According to another aspect of embodiments herein, the object is achieved by a method performed by a NSSF node for assisting an AMF node to allocate a target network slice instance to serve a PDU session for a UE in a communications network. The NSSF node receives an indication from a Network Data Analytics Function (NWDAF) node. The indication indicates a traffic behavior of data packets transmitted in the PDU session. The NSSF node then decides to change an allocation of a first network slice instance that is serving the PDU session, to the target network slice instance, based on policy rules and the received indication indicating the traffic behavior. The NSSF node then assists the AMF node to allocate the target network slice instance to serve the PDU session for the UE. This is performed by transmitting, to the AMF node, information about the decision to change the allocation of the PDU session for the UE from the first network slice instance to the target network slice instance, and an identifier of the target network slice instance.

According to another aspect of embodiments herein, the object is achieved by a method performed by a target SMF node of a target network slice instance for assisting an AMF node to allocate the target network slice instance to serve a PDU session for a UE in a communications network. The target SMF node receives information from the AMF node. The information is about a UE context related to the UE and AN tunnel information to be used for the PDU session. The target SMF node then transmits towards a target User Plane Function (UPF) node of the target network slice instance, the received AN tunnel information to be used for the PDU session. Then the target SMF node receives, from the target UPF node, target CN tunnel information to be used for the PDU session. The target SMF node then transmits, towards the AMF node, the received target CN tunnel information to be used for the PDU session.

According to another aspect of embodiments herein, the object is achieved by an AMF node. The AMF node is configured to allocate a target network slice instance to serve a PDU session for a UE in a communications network. The AMF node is further configured to:

Receive, from a NSSF node, information about a decision to change an allocation of a first network slice instance, which is adapted to serve the PDU session, to the target network slice instance, and an identifier of the target network slice instance.

Retrieve, from a first SMF node of the first network slice instance, a UE context adapted to be related to the UE and the PDU session.

Transmit, towards a target SMF node of the target network slice instance, information about the retrieved UE context and AN tunnel information adapted to be used for the PDU session.

Receive, from the target SMF node, target CN tunnel information adapted to be used for the PDU session.

Allocate the target network slice instance to route data flows pertaining to the PDU session by transmitting, towards an AN node, the target CN tunnel information adapted to be used for the PDU session.

According to another aspect of embodiments herein, the object is achieved by an NSSF node. The NSSF node is configured to assist an AMF node to allocate a target network slice instance to serve a PDU session for a UE in a communications network. The NSSF node is further configured to:

Receive, from an NWDAF node, an indication adapted to indicate a traffic behaviour of data packets transmitted in the PDU session.

Decide to change an allocation of a first network slice instance that is adapted to serve the PDU session, to the target network slice instance, based on policy rules and the received indication adapted to indicate the traffic behavior.

Assist the AMF node to allocate the target network slice instance to serve the PDU session for the UE by transmitting, to the AMF node, information about the decision to change the allocation of the PDU session for the UE from the first network slice instance to the target network slice instance, and an identifier of the target network slice instance.

According to another aspect of embodiments herein, the object is achieved by a target SMF node. The target SMF node is configured to assist an AMF node to allocate a target network slice instance to serve a PDU session for a UE in a communications network. The target SMF node is further configured to:

Receive, from the AMF node, information about a UE context related to the UE and AN tunnel information adapted to be used for the PDU session.

Transmit, towards a target UPF node of the target network slice instance, the received AN tunnel information adapted to be used for the PDU session.

Receive, from the target UPF node, target CN tunnel information adapted to be used for the PDU session.

Transmit, towards the AMF node, the received target CN tunnel information adapted to be used for the PDU session.

Advantages of embodiments herein comprise that operators may better control the resource utilization, making sure that optimized network slices are only used when needed, but not before. When the use of optimized resources has an associated cost, due to the use of additional software licenses, high-speed data links and transit networks, there is an economical benefit in using those additional resources only when they are really needed.

BRIEF DESCRIPTION OF THE DRAWINGS

Examples of embodiments herein are described in more detail with reference to attached drawings in which:

FIG. 5 is a flowchart depicting embodiments of a method in an AMF node.

FIGS. 13 to 16 are flowcharts illustrating methods implemented in a communication system including a host computer, a base station and a user equipment.

DETAILED DESCRIPTION

Example embodiments herein provide a method for enabling real-time monitoring and analysis of UE traffic and policy rule evaluation for an alternative network slice instance selection and allocation, different to the one currently allocated. This alternative network slice instance may offer additional services such as e.g. content caching, high-speed links, firewall and intrusion detection systems.

Figure 1:
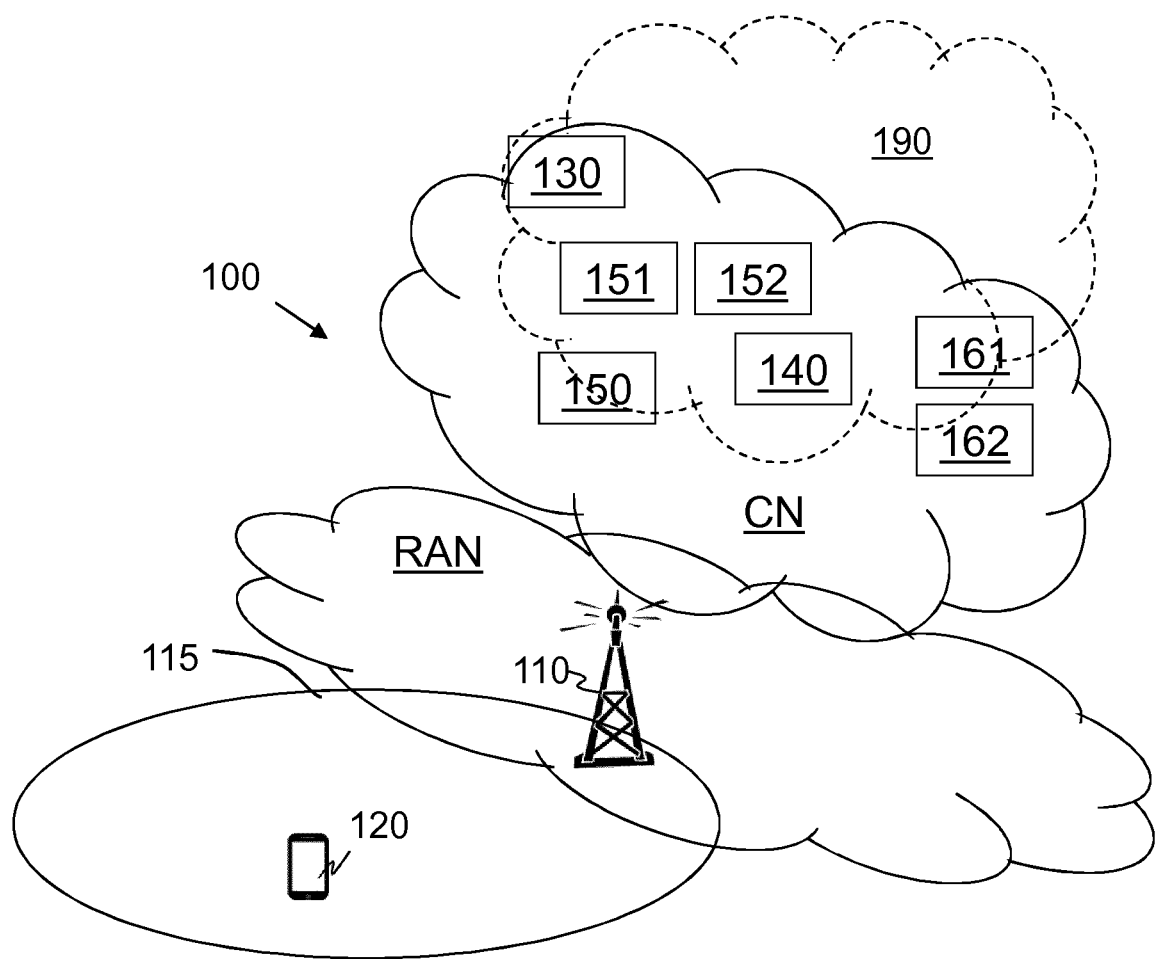
FIG. 1 is a schematic block diagram illustrating embodiments of a communications network

FIG. 1 is a schematic overview depicting a communications network 100 wherein embodiments herein may be implemented. The communications network 100 comprises one or more Radio Access Networks (RANs) and one or more Core Networks (CNs). The communications network 100 may use 5G New Radio (NR) but may further use a number of other different technologies, such as, Next Generation Radio Access Network (NG-RAN), Evolved Universal Terrestrial Radio Access Network (E-UTRAN), Universal Terrestrial Radio Access Network (UTRAN), GSM EDGE Radio Access Network (GERAN), just to mention a few possible implementations.

Wireless devices such as e.g. a UE 120 operate in the communications network 100. The UE 120 may e.g. be a NR device, a mobile station, a wireless terminal, a Narrow Band (NB)-IoT device, an eMTC device, a CAT-M device, a WiFi device, an LTE device and an a non-access point (non-AP) STA, a STA, that communicates via a base station such as e.g. a network node 110, one or more Access Networks (AN), e.g. a RAN, to one or more CNs. It should be understood by the skilled in the art that "UE" is a non-limiting term which means any terminal, wireless communication terminal, user equipment, Device to Device (D2D) terminal, or node e.g. smart phone, laptop, mobile phone, sensor, relay, mobile tablets or even a car or any small base station communicating within a cell 115 provided by the network node 110. The UE 120 may also be a non-wireless device, for example, an Optical Network Terminal (ONT) that is connectable to residential broadband access, such as Passive Optical Network (PON).

The network node 110 operates in the communications network 100. The network node 110 is e.g. a radio access node and may be a transmission and reception point e.g. a radio access network node such as a base station, e.g. a radio base station such as a NodeB, an evolved Node B (eNB, eNode B), an NR Node B (gNB), a base transceiver station, a radio remote unit, an Access Point Base Station, a base station router, a transmission arrangement of a radio base station, a stand-alone access point, a Wireless Local Area Network (WLAN) access point or an Access Point Station (AP STA), an access controller, or any other network unit capable of communicating with a UE within the cell 115 served by the network node 110 depending e.g. on the radio access technology and terminology used. The network node 110 may also be a wired node, such as an Optical Line Terminal (OLT) in a Passive Optical Network. The network node 110 may be referred to as a serving radio network node and communicates with a UE 120 with Downlink (DL) transmissions to the UE 120 and Uplink (UL) transmissions from the UE 120.

Among others, one or more of the following network nodes operate in the CN the wireless communications network 100.

An AMF node 130.
A NSSF node 140.
A NWDAF node 150.
A first SMF node 151 or a target SMF node 152.
A first UPF node 161 or a target UPF node 162.

The methods according to embodiments herein may in a first aspect be performed by the AMF node 130, the NSSF node 140 or the target SMF node 152. As an alternative, a Distributed Node (DN) and functionality, e.g. comprised in a cloud 190 as shown in FIG. 1, may be used for performing or partly performing the methods.

As used herein, the term "node", or "network node", may refer to one or more physical entities, such as devices, apparatuses, computers, servers or the like. This may mean that embodiments herein may be implemented in one physical entity. Alternatively, the embodiments herein may be implemented in a plurality of physical entities, such as an arrangement comprising said one or more physical entities, i.e. the embodiments may be implemented in a distributed manner.

The embodiments herein generally relate to network slicing; and, more specifically, to allocation of network slices in a 5G network.

Figure 2:
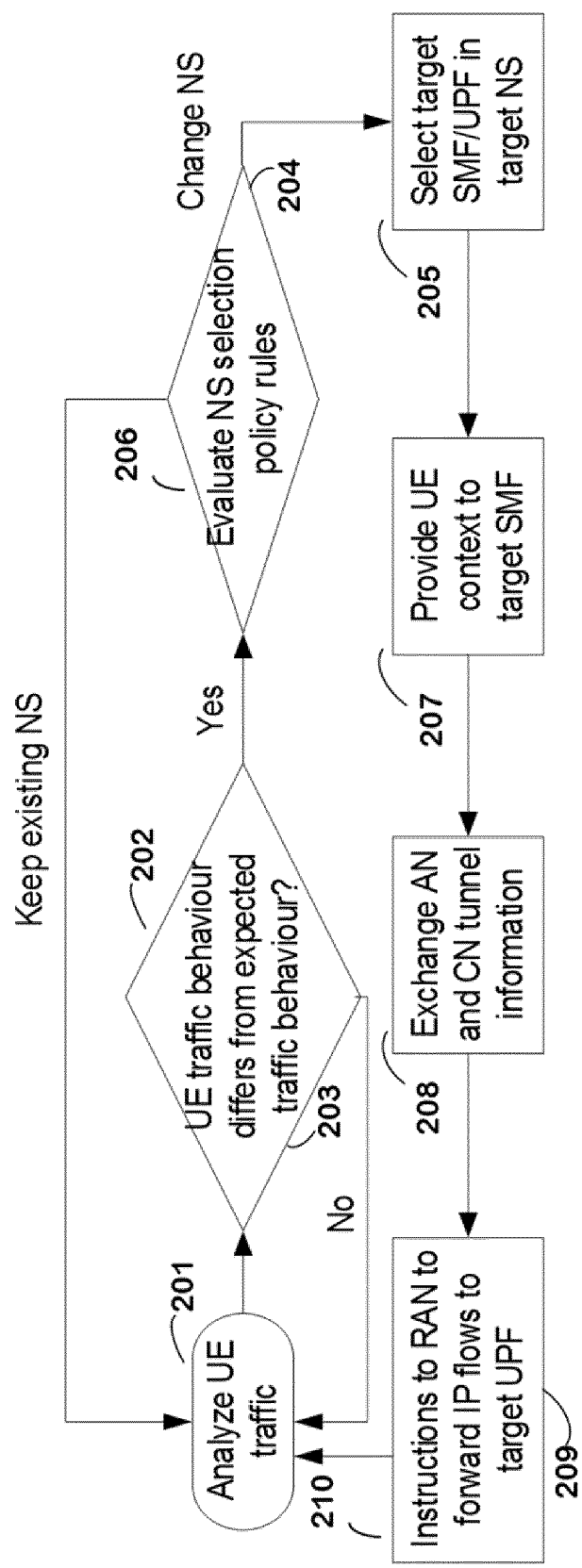
FIG. 2 is a flowchart depicting embodiments of a method.

FIG. 2, illustrates a flowchart of an example method according to embodiments herein. The method may e.g. comprise one or more of the following steps:

Step 201: Traffic of a UE 120 is analyzed in a constant process.
Step 202: If the traffic behavior of the UE 120 differs from the expected traffic behavior, which might be different for each type of UE, then the Network Slice (NS) selection policy rules for the UE 120 is evaluated.
Step 203: If the traffic behavior of the UE 120 does not differ from the expected traffic behavior, then return to analyzing traffic of the UE.
Step 204: If the NS selection policy rules for the UE 120 indicates a change in the network slice, then select a target SMF 152 and further select a target UPF 162 deployed in the target network slice, step 205.
Step 206: If the NS selection policy rules for the UE 120 does not indicate a change in the network slice, then return to analyzing traffic of the UE 120.
Step 207: Provide the existing UE context to the target SMF 152.
Step 208: Enable the exchange of access network tunnel info and target core network tunnel info between the RAN and target UPF 162.
Step 209: Provide instructions to the RAN to deliver data flows, i.e. data flows pertaining to the PDU session, to the target UPF 162. Either new data flows or all data flows are affected.
Step 210: Resume analyzing the UE 120 traffic.

The above steps will be described more in detail further on.

The embodiments herein e.g. provide for a method for selecting a target network slice instance, which is different from a previous network slice instance allocated at a PDU session establishment for a UE, and allocating the target network slice instance to route data flows pertaining to the PDU session.

Figure 3:
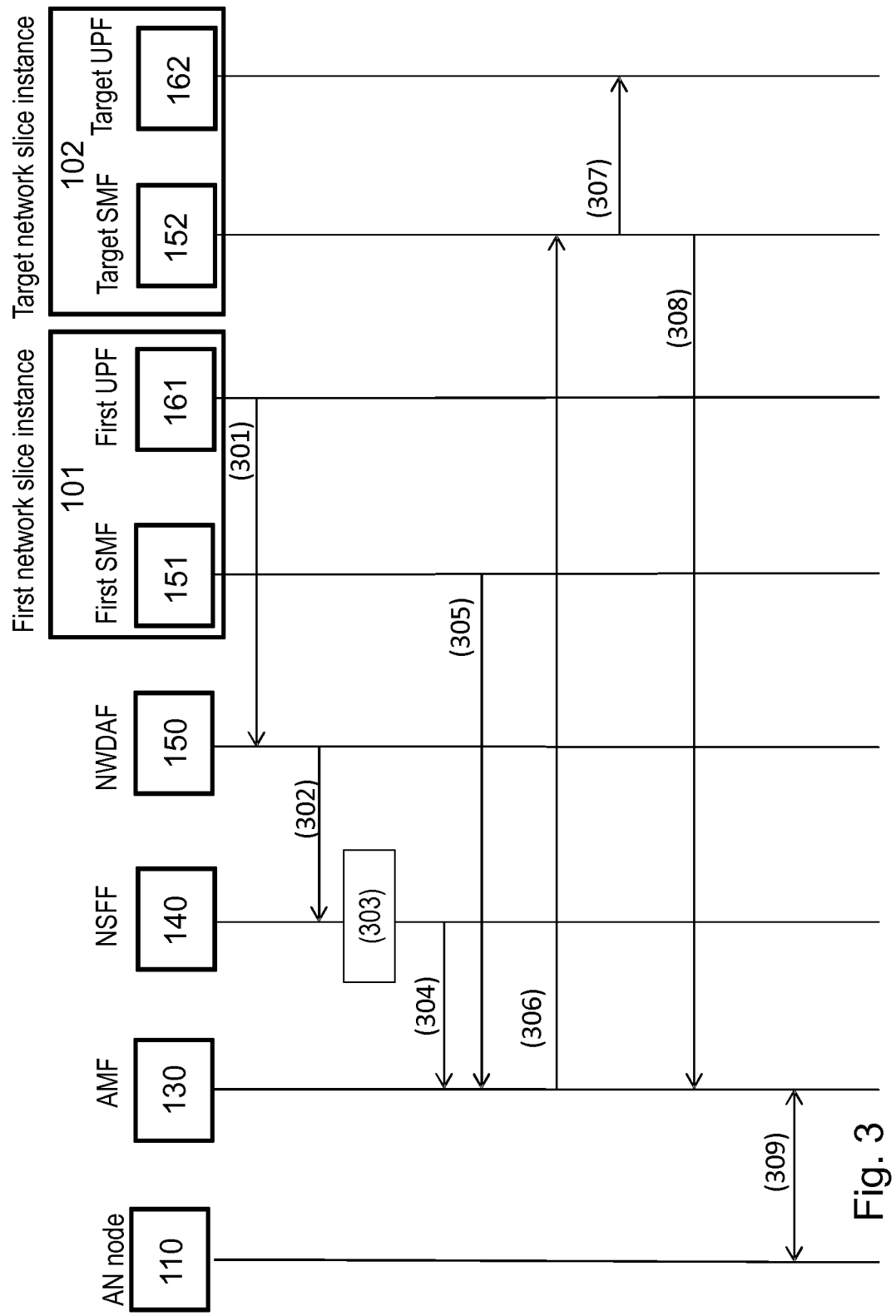
FIG. 3 is a sequence diagram illustrating embodiments of a method.

First the method will be swiftly described together with FIG. 3 in view of the communications system 100. The method will then be described together with FIG. 4 in view of the NSSF node 140, together with FIG. 5 in view of the AMF node 130, and together with FIG. 6 in view of the target SMF node 152.

FIG. 3 is a signal scheme, illustrating some example embodiments herein. The example method comprises the following actions:

Action 301. The first UPF node 161 of the first network slice instance 101 is allocated to route a PDU session established for the UE 120. The first UPF node 161 monitors activity of the UE 120 and reports the monitored activity of the UE 120 towards the NWDAF node 150 for analysis.
Action 302. The NWDAF node 150 then analyses, the monitored activity of the UE 120 to determine an insight indicating a traffic behaviour. The NWDAF node then transmits the insight towards the Network Slice Selection Function (NSSF) node 140.
Action 303. The NSSF node 140 determines a target network slice instance 102 which is different from the first network slice instance 101. This is performed by applying selection policy rules based at least on the insight.
Action 304. Then the NSSF node 140 transmits an identifier of the determined target network slice instance 102 towards the AMF node 130. The NSSF node 104 may also transmit an identifier of the PDU session.
Action 305. The AMF node 130 retrieves a UE context for the UE 120 from the first SMF node 151 of the first network slice instance 101. The UE context may include a current UE IP address.
Action 306. The AMF node 130 then selects the target SMF node 152 of the target network slice instance 102, and transmits, towards the target SMF node 152, the retrieved UE context and Access Network (AN) tunnel information available at the AMF node 130 for the PDU session.
Action 307. The target SMF node selects the target UPF node 162 of the target network slice instance 102, and transmits, towards the target UPF node 162, the AN tunnel information.
Action 308. The target SMF node 152 receives, from the target UPF node 162, target CN tunnel information. The target SMF node 152 then transmits the received target CN tunnel information towards the AMF node 130.
Action 309. The AMF node 130 notifies an Access Network (AN) node 110 by transmitting the target CN tunnel information. The AN node then routes selected data flows of the PDU session through the target network slice instance 102 by using the target CN tunnel information.

Figure 4:
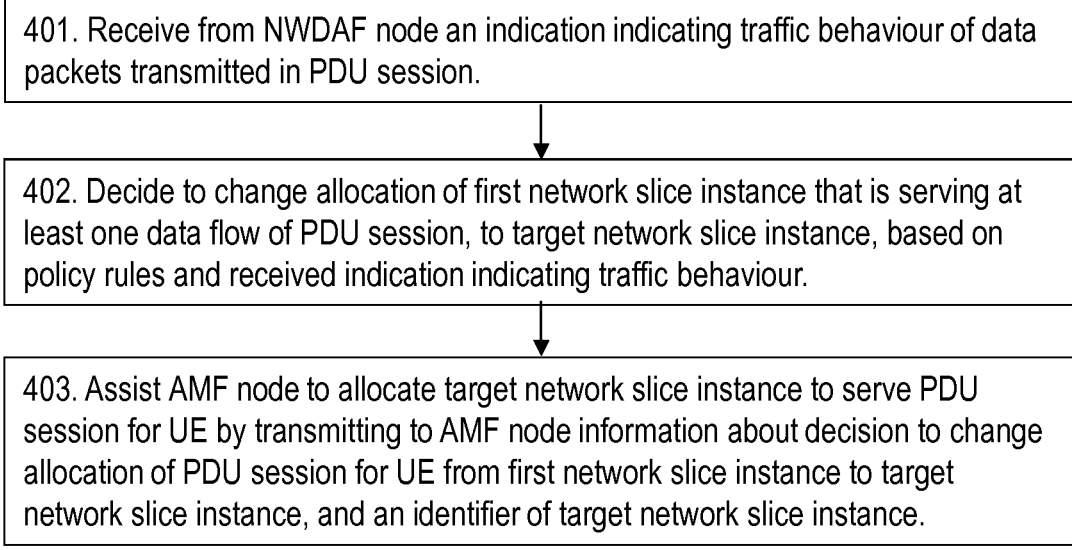
FIG. 4 is a flowchart depicting embodiments of a method in an NSSF node.

The method according to embodiments herein will now be described, from the view of the NSSF node 140 together with FIG. 4. Example embodiments of a method performed by the NSSF node 140, for assisting the AMF node 130 to allocate the target network slice instance 102 to serve a PDU session for the UE 120 in the communications network 100, will now be described with reference to a flowchart depicted in FIG. 4.

The method comprises the following actions, which actions may be taken in any suitable order.

Action 401

According to an example scenario and as introduction to NSSF node involvement, when the UE 120 begins a PDU session, the PDU session is initially served by a first network slice instance 101. The UE's 120 traffic activity during the PDU session is first monitored by an first UPF node 161 and then reported to an NWDAF node 150. The NWDAF node 150 analyses the monitored activity of the UE 120 to determine a traffic behaviour of the UE 120. The traffic behaviour will be used for allocating a new network slice instance, i.e. the target network slice instance 102. Thus, the NSSF node 140 receives, from the NWDAF node 150, an indication indicating the traffic behaviour of data packets transmitted in the PDU session.

Action 402

Policy rules and the received indication of the traffic behaviour of the UE 120 will be used for deciding whether to change allocation of the network slice instance. Thus, the NSSF node 140 decides to change an allocation of a first network slice instance 101 that is serving the PDU session, to the target network slice instance 102, based on policy rules and the received indication indicating the traffic behaviour.

Action 403

The NSSF node 140 has decided to change the allocation to the network slice instance that is serving a given PDU session, and will assist the AMF node 130 to allocate the target network slice instance 102, by communicating this decision, to the AMF node 130. The NSSF node 140 thus assists the AMF node 130 to allocate the target network slice instance 102 to serve the PDU session for the UE 120 by transmitting information about the decision to the AMF node 130. The information is about the decision to change the allocation of the PDU session for the UE from the first network slice instance 101 to the target network slice instance 102. The information is further about an identifier of the target network slice instance 102.

The method performed by the NSSF node 140 will be described more in detail below in FIGS. 7a and 7b.

The method according to embodiments herein will now be described, from the view of the AMF node 130 together with FIG. 5. Example embodiments of a method performed by the AMF node 130, for allocating the target network slice instance 102 to serve a PDU session for the UE 120 in the communications network 100, will now be described with reference to a flowchart depicted in FIG. 5.

The method comprises the following actions, which actions may be taken in any suitable order. Actions that are optional are presented in dashed boxes in FIG. 5.

Action 501

As mentioned above, and according to embodiments herein, the AMF node 130 receives information from the NSSF node 140. The information is about the decision to change an allocation of a first network slice instance 101 that is serving the PDU session to the target network slice instance 102, and an identifier of the target network slice instance 102.

Action 502

The first SMF node 151 has created a current UE context for the UE 120.
The AMF node 130 therefore retrieves a UE context from a first SMF node 151 of the first network slice instance 101. The UE context is related to the UE 120 and the PDU session. The UE context may e.g. include a current UE IP address.

Action 503

In some embodiments, the AMF node 130 selects the target SMF node 152 of the target network slice instance 102. This selection is due to the fact that there may be a plurality of SMF nodes deployed in the target network slice instance, and the AMF node would select one out of them.

Action 504

Then the AMF node 130 transmits, towards a target SMF node 152 of the target network slice instance 102, information about the retrieved UE context and AN tunnel information to be used for the PDU session. The UE context comprises information related to the UE and the PDU session, such as the UE identifiers, Quality of Service information, access type information, etc. The AN tunnel information may e.g. be the access network address of the N3 user plane interface corresponding to the PDU session. N3 refers to the logical interface between the access network and the UPF in a 5G system. The AN tunnel information may comprise a Tunnel Endpoint Identifier (TEID) and the IP address and port number that is used by the NG-RAN node for the PDU Session.

Action 505

The AMF node 130 receives, from the target SMF node 152, target CN tunnel information to be used for the PDU session. The target CN tunnel information will be used by the Access Network to forward user plane data flows pertaining to the PDU session towards the target UPF node. The target CN Tunnel information may be the core network address of the N3 user plane interface corresponding to the PDU session Correct?. The CN Tunnel information e.g. comprises a TEID and the IP address and port number which is used by the UPF for receiving user plane traffic for the PDU session.

Action 506

The AMF node allocates the target network slice instance 102 to route data flows pertaining to the PDU session by transmitting, towards an Access Network, AN, node, the target CN tunnel information to be used for the PDU session. New or all data flows pertaining to this PDU session may be routed through the target CN tunnel according to the information provided by the target UPF node 162 in the target network slice instance 102.

Action 507

The AMF node 130 may transmit a response to the NSSF node 140 comprising an acknowledgement of the decision to change an allocation of the PDU session from the first network slice instance 101 to the target network slice instance 102. This is so that the NSSF node 140 may keep track of the network slice instance allocated to the PDU session.

The method performed by the AMF node 130 will be described more in detail below in FIGS. 7a and 7b.

Figure 6:
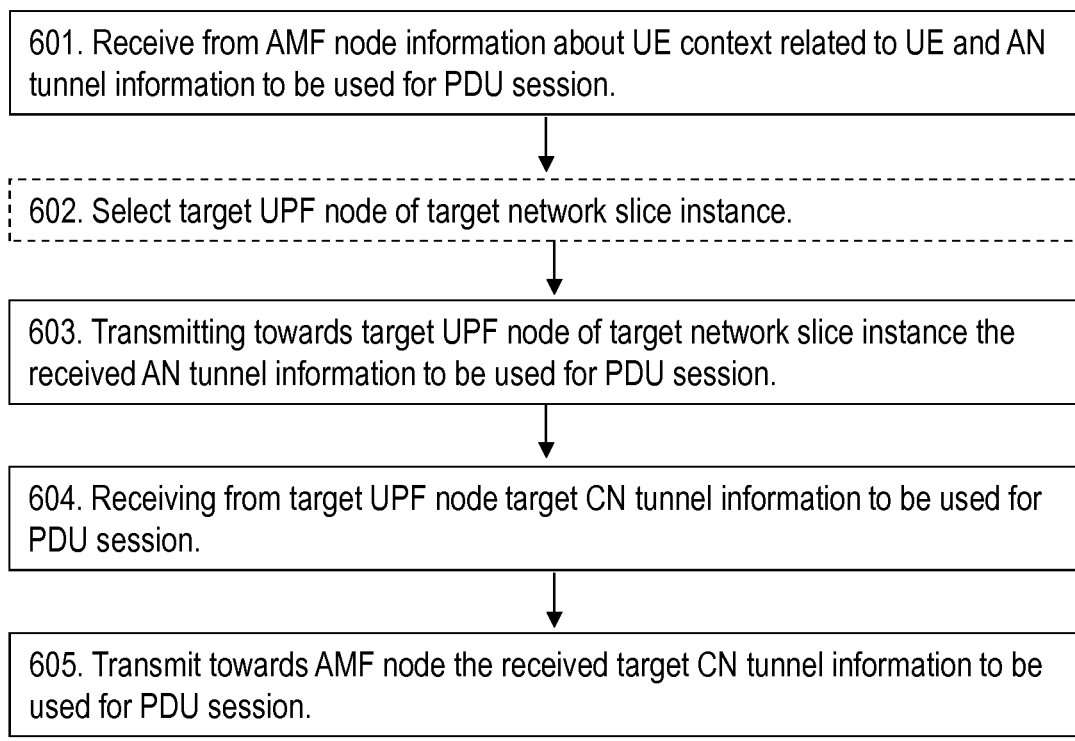
FIG. 6 is a flowchart depicting embodiments of a method in a target SMF node.

The method according to embodiments herein will now be described, from the view of the target SMF node 152 together with FIG. 6. Example embodiments of a method performed by the target SMF node 152, for assisting the AMF node 130 to allocate the target network slice instance 102 to serve a PDU session for the UE 120 in the communications network 100 will now be described with reference to a flowchart depicted in FIG. 6.

The method comprises the following actions, which actions may be taken in any suitable order.

Action 601

The target SMF node 152 receives from the AMF node 130, information about a UE context related to the UE 120 and AN tunnel information to be used for the PDU session, as mentioned above. The UE context may comprise an UE IP address, quality of service information, access type, location information, data network name. The target SMF node 152 receives the UE context in the first SMF node 151, that is kept assigned to the UE 120, because both instances of network slices, i.e. the first network slice instance 101 and the target network slice instance 102, provide connectivity to the same data network. Therefore, the UE IP address does not change.

Action 602

The target SMF node 152 may select the target UPF node 162 of the target network slice instance 102. This selection is due to the fact that there may be a plurality of UPF nodes deployed in the target network slice instance, and the SMF node would select one out of them according to the parameters of the PDU session.

Action 603

The target SMF node 152 then transmits, towards a target User Plane Function, UPF, node 162 of the target network slice instance 102, the received AN tunnel information to be used for the PDU session. The target SMF node may also transmit parameters describing the PDU session. The AN tunnel information may be the access network address of the N3 user plane interface corresponding to the PDU session. The AN tunnel information may comprise a Tunnel Endpoint Identifier (TEID) and the IP address and port number that is used by the AN node for receiving user data for the PDU Session.

Action 604

The target SMF node 152 receives, from the target UPF node 162, CN tunnel information to be used for the PDU session. The target CN Tunnel information may be the core network address of the N3 user plane interface corresponding to the PDU session. It e.g. comprises a TEID and the IP address and port number which is used by the UPF for receiving user data for the PDU session.

Action 605

The target SMF node 152 then transmits, towards the AMF node 130, the received target CN tunnel information to be used for the PDU session. The AN node will then use the target CN tunnel information to route selected data flows of the PDU session through the target network slice instance 102.

The method performed by the target SMF node 152 will be described more in detail below in FIGS. 7a and 7b.

Embodiments herein such as mentioned above will now be further described and exemplified. The text below is applicable to and may be combined with any suitable embodiment described above.

In some embodiments herein, the monitored traffic activity may be carried out on packets that the UE is sending and receiving, and may comprise an analysis activity, e.g. counting the number of packets, analysing its payload and payload size, determining the source or destination, etc., a comparison activity, e.g. comparing current UE traffic with one or more expected traffic criteria, and a determination activity, e.g. determining a number of selected packets that match, or differ from, one or more traffic criteria, for determining a traffic behaviour.

Advantageously, the traffic behaviour comprises at least one of a service identifier, number of packets, packet size, source and destination of packets and packet rate.

In some embodiments herein, the NSSF node 140 may also determine a selection indication to select affected data flows of the PDU session to be routed through the target network slice instance, and transmit the selection indication towards the AMF node 130. In these embodiments, the AMF node 130 may transmit the selection indication towards the AN node 110, and the AN node 110 may use the selection indication to determine the selected data flows.

Some embodiments herein comprise a mechanism for addressing use cases related to network slice selection and allocation in 5GC.

Examples of use cases that may benefit from the selection and allocation of network slice selection e.g. comprises:

Unmanaged IoT devices. The traffic of IoT devices which e.g. may comprise the UE 120, is highly predictable due to the absence of human intervention and may be used in embodiments herein. It is feasible to monitor the activity of IoT devices in the communications network 100. If a IoT device is not behaving according to historical or normal traffic behavior, the reason might be a malware infection of the IoT devices or a general malfunction. It is desirable to isolate the IP traffic of the suspected IoT device, so that the communications network 100 and other IoT devices are not affected but this malfunction. The mechanism described in embodiments herein may detect the abnormal traffic behavior and dynamically change the allocated network slice instance to a quarantine network slice instance, where the deployment of a firewall, intrusion detection system, and debugging tools may help an operator with an analysis of this IoT device. Operators may create a business case for selling dynamic protection of IoT devices to IoT tenants. This use case may typically affect all the current and future data flows pertaining to the PDU Session.

UE traffic download. When the UE 120 downloads a certain type of traffic, e.g., images, videos, software, etc., the 5G CN may determine this behavior and allocate an optimized network slice where a cache is deployed. This cache is likely to have stored the content requested by the UE 120, and as a consequence, the UE 120 benefits from a faster download, and the operator benefits from not incurring in charges due to the use of transit networks. This use case typically affects new data flows that will be established within the PDU Session. The reason is that existing data flows should not disturbed by the presence of intermediaries, such as a cache or intrusion detection systems.

UE connectivity. Similar to the previous use case, when the UE 120 is establishing a layer 7 session towards a given third party provider, for which the operator has deployed high-speed links, or a link through a local neutral exchange point, which are able to provide less latency, the 5G CN may allocate an optimized network slice where these high-speed links or connections to a local neutral exchange point are deployed. Layer 7 refers to the seventh and topmost layer of the Open Systems Interconnect (OSI) Model known as the application layer. This provides a benefit for the UE 120, due to the lower latency in communications, and to the operator, due to the avoidance of use of transit networks, which are charged per usage. This use case typically affects new data flows that will be established within the PDU Session.

Figure 7A:
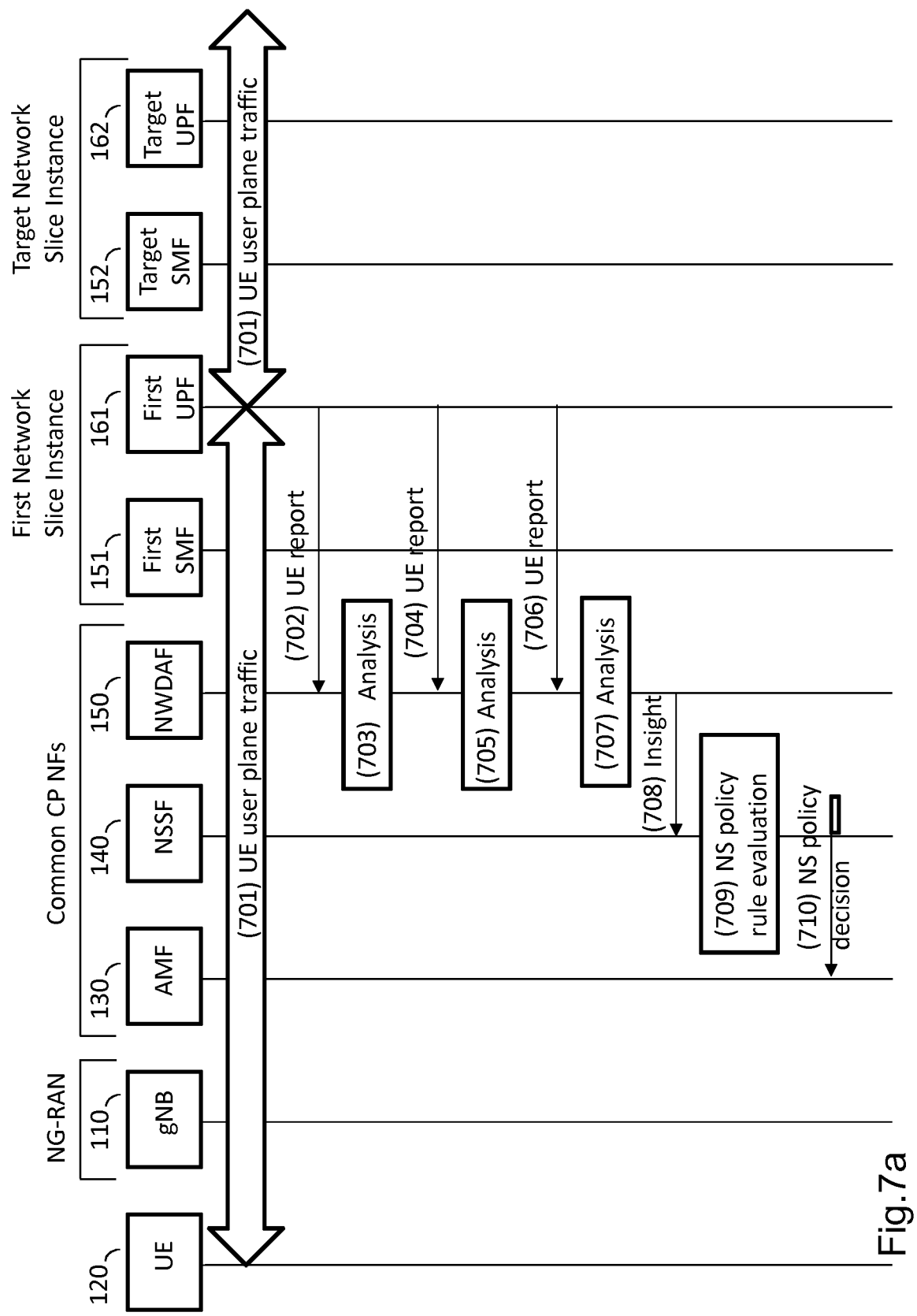
FIGS. 7a and b are sequence diagrams depicting embodiments of a method.
Figure 7B:
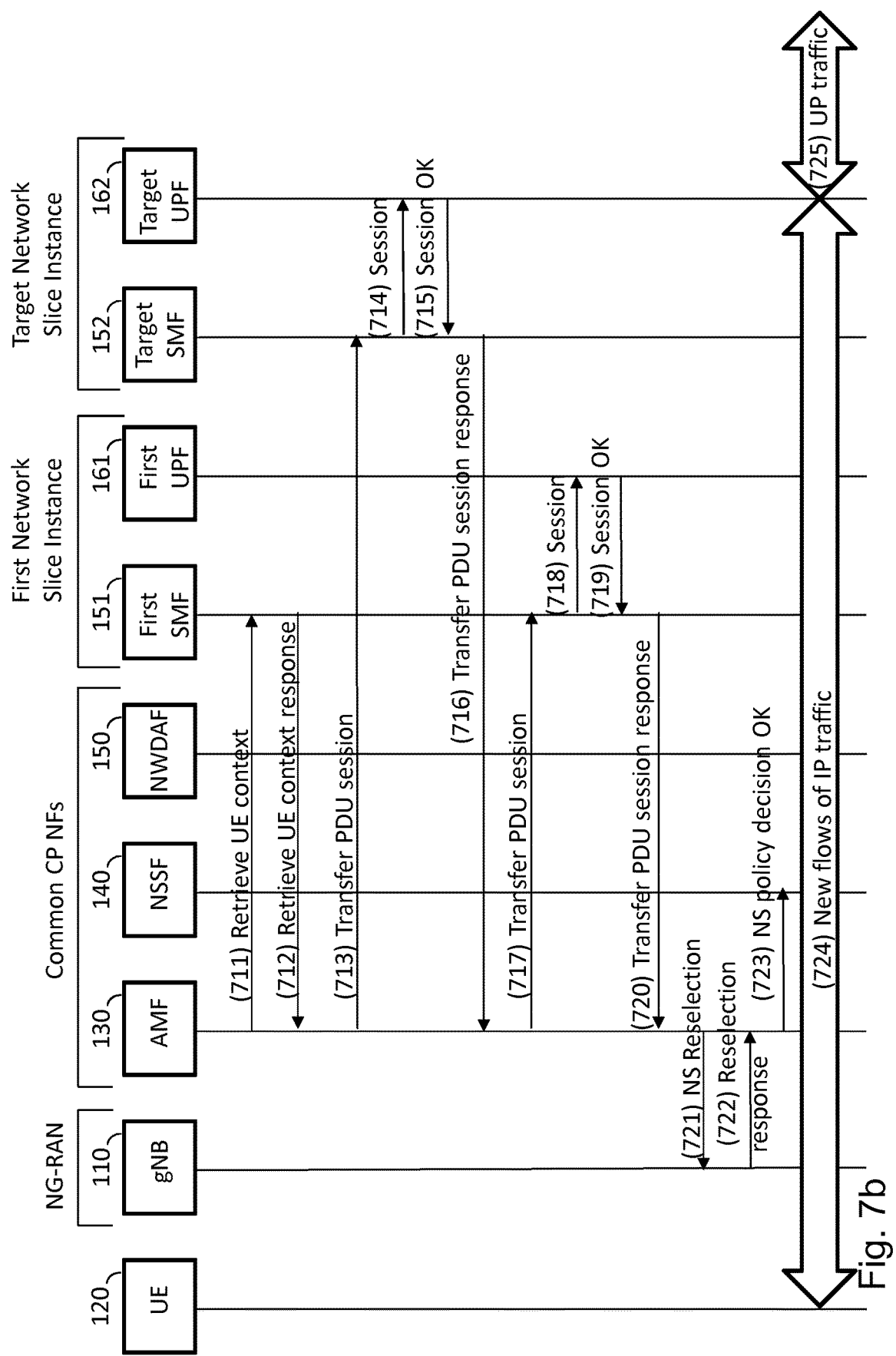

An example of embodiments herein is depicted in a signaling diagram in FIGS. 7a and 7b. Steps 701-710 is depicted in FIG. 7a and steps 711-724 are depicted in FIG. 7b.

When the UE 120 establishes a PDU session, the PDU session is initially served by a default network slice instance of a given type such as e.g., eMMB, MIoT, URLLC, such as the first network slice instance 101.

The UE 120 may connect to the Data Network and course regular traffic (step 701). A Deep Packet Inspection (DPI) embedded into the UPF node, e.g. the first UPF node 161 of the first network slice instance 101, is configured to provide to the NWDAF node 150 a copy of selected packets originated at or destined to the UE 120, to the NWDAF node 150. For example, the DPI may provide a copy of downloaded packets at the same time that it marks them as part of an "image download" session, such as those associated to the download of GIF, JPEG, and PNG files.

In another example, suitable for monitoring IoT devices, the DPI may be configured to provide a copy of the packets when the rate or size of the packets excess a predefined threshold. In any case, the DPI in the first UPF node 161 sends a sample of marked IP packets to the NWDAF node 150 (steps 702, 704, and 706).

The NWDAF node 150 performs an analysis of the received UE 120 samples (steps 703, 705, and 707). The NWDAF node 150 is configured to produce an insight whenever the UE 120 has downloaded a predefined number of bytes of the image download service or whenever the number of packets or size of packets transmitted by the UE 120 exceeds what is considered the normal behavior, in the case of IoT monitoring. When the figures or packets or size of them exceeds those of the normal behavior, the NWDAF node 150 may produce an insight, or indication, to the NSSF node 140 indicating this fact (step 708).

An insight or indication, when used herein, may be a message comprising a characterization of the analyzed traffic according to certain characteristics of interest. For example, the insight or indication may indicate that the UE 120 user plane traffic is characterized as video streaming service of a popular video streaming service. Or, the insight or indication may characterize the traffic as abnormal based on comparisons of the amount of current traffic, e.g. bandwidth, number of packets, size of packets, compared to the traffic received in a previous window of time.

The NSSF node 140 receives insights or indications from the NWDAF node 150 (step 708) and executes the network slice policy rule evaluation procedure (step 709). This procedure takes into account a number of inputs, including the user's identity, e.g., the SUPI in 5G, the UE's category, e.g., gold, silver, bronze, the location of the UE 120 in the network, the insight or indication received from the NWDAF node 150 in (step 708), the currently allocated instance of network slice, the available network slices together with their configured services, the status of congestion of the available network slice instances, and any other input that the NSSF node 140 may consider relevant for executing evaluating of the network slice selection policy and take a policy decision.

The NSSF node 140 executes a network slice selection policy decision according to the configured policy rules. For example, a policy rule has been created so that when the user is engaged in an image download service the PDU session of this user is routed through to the optimized network slice instance, i.e. the target network slice instance 102, that offers cached or image adaptations towards the UE 120. Another policy rule may be created for IoT devices, indicating that if insights or indications are received for suspected IoT devices, e.g., because their traffic is abnormally high, their traffic should be routed through a quarantine IoT network slice instance, i.e. the target network slice instance 102.

In case of the UE 120 being a mobile broadband UE, this decision affects future data flows that the UE 120 will establish over this PDU session. Existing data flows remain being served over the default network slice instance, for not disturbing them. However, for suspected IoT devices, the policy decision takes place immediately for both existing and future data flows, because this is a security use case that is going to prevent further forwarding of IP packets, they are blocked by a firewall deployed in the quarantine network slice instance, i.e. in the target network slice instance.

Two examples of Network Slices Selection Policies are:
Gold category Mobile Broadband UEs, when using the service provided by a popular video streaming service, their traffic should be routed through a given instance of a network slice, because this network slice is enhanced with a video optimizer engine, but that only applies when the location of the UE 120 is within the current metropolitan area, and such network slice has less than 80% of load.

All IoT devices, when their traffic triples the mean traffic measured during the last minutes of time, their traffic should be routed through a quarantine network slice instance where a firewall prevents the traffic to reach its destination. Additionally, an alarm should be raised to an operator for further investigation of the IoT behavior.

When the NSSF node 140 executes a policy decision to change the allocation to the network slice instance that is serving a given PDU session, e.g. the target network slice instance 102, the NSSF node 140 communicates this decision to the AMF node 130 allocated to this UE 120 (step 710). The AMF that is serving the UE does not change while the UE is registered to the network, therefore, the AMF is a permanent anchor from the signaling point of view.

The AMF node 130 first retrieves the current UE 120 context that the first SMF node 151 has created for this UE 120 (steps 711 and 712).

Then the AMF node 130 selects a new target SMF node 152 in the optimized/quarantine network slice instance, e.g. the target network slice instance 102, and contacts it (step 713) for the purpose of transferring data flows of the PDU session. In (step 713) the AMF sends to the target SMF node 152 the existing UE 120 context retrieved from the first SMF node 151, including the UE 120 IP address, that is kept assigned to the UE 120, because both instances of network slices, the initial and the optimized/quarantine one, i.e. the first network slice instance 101 and the target network slice instance 102, provide connectivity to the same Data Network, therefore, the UE's 120 IP address does not change. In (step 713) the AMF node 130 also sends to the target SMF node 152 the Access Network tunnel information.

The Access Network tunnel information is the access network address of the N3 tunnel corresponding to the PDU session. It comprises the Tunnel Endpoint Identifier (TEID) and the IP address and port number that is used by the Access Network node for the PDU session. Similarly, the CN Tunnel information is the Core Network address of the N3 tunnel corresponding to the PDU session. It comprises the TEID and the IP address and port number which is used by the UPF for the PDU session.

The target SMF 152 selects a target UPF node 162 in the target network slice, and sends to it (step 714) the AN tunnel information received from the AMF node 130, allowing the target UPF node 162 to create a tunnel toward the access network for transferring data flows pertaining to the PDU session. The UPF sends Core Network tunnel information to the target SMF node 152 (step 715). Then the target SMF node 152 communicates, to the AMF node 130, the target CN tunnel information (step 716).

The AMF node 130 also contacts the first SMF node 151 in the default network slice, i.e. the first network slice instance 101 (step 717) for communicating that, whether existing data flows should remain intact or immediately deleted, depending on the use case. When data flows cease to exist, the UE context in the first SMF node 151 and the first UPF node 161 may be safely deleted. The first SMF node 151 informs the first UPF node 161 (step 718) when the last data flow of this PDU session is finished. Proper acknowledgement is sent from the first UPF node 161 to the first SMF node 151 (step 719) and from the first SMF node 151 to the AMF node 130 (step 720).

The AMF node 130 then contacts the NG-RAN (step 721) for indicating the new network slice reselection, i.e., that new or all data flows pertaining to this PDU session should be routed through new CN tunnel info provided by target UPF node 162 in the optimized/quarantine network slice instance, i.e. the target network slice instance 102. Therefore, this message has an indication of which data flows should be routed through which CN tunnel information, either all data flows, or selected data flows, or just new data flows that will be later established within the same PDU session. The NG RAN acknowledges this decision (step 722).

The AMF node 130 also responds to the NS Policy Decision message (step 710) with an appropriate response (step 723) to the NSSF node 140, so that the NSSF node 140 may keep track of the network slice instance allocated to this PDU session.

After (step 723), the NG-RAN may route new, selected or all data flows of this PDU session through the CN tunnel that routes data through an optimized/quarantine network slice instance, i.e. a target network slice instance 102 (steps 724 and 725). If the data flow is used for downloading content that is cached in cache network function, that content is served from the cache itself, thus, being received by the UE 120 much faster that if it was available in a server far away. If that data flow is related to a suspected malicious IoT session, a firewall deployed in the quarantine network slice will prevent this traffic from reaching its destination and attacking other devices or network functions.

As a result, in the mobile broadband use case, the existing data flows of the PDU session are still routed through the default network slice instance, i.e. the first network slice instance 101. But newer data flows that the UE 120 will establish in the future will be routed through the optimized network slice instance, i.e. the target network slice instance 102. If these new data flows are of type image download, and if the content is cached in the cache network function deployed in this optimized network slice instance, i.e. target network slice instance 102, the user will notice a much faster image download that when the PDU session was routed through the default network slice instance, i.e. first network slice instance 101.

In case of suspected IoT traffic, both existing and new data flows are immediately routed through the quarantine network slice instance, i.e. the target network slice instance 102, where a firewall and other security appliances are deployed, for preventing the suspected traffic to serve as an attack to other IoT devices or network functions. Additional security network functions may help an operator or process to debug the suspected IoT traffic activity.

Figure 8A:
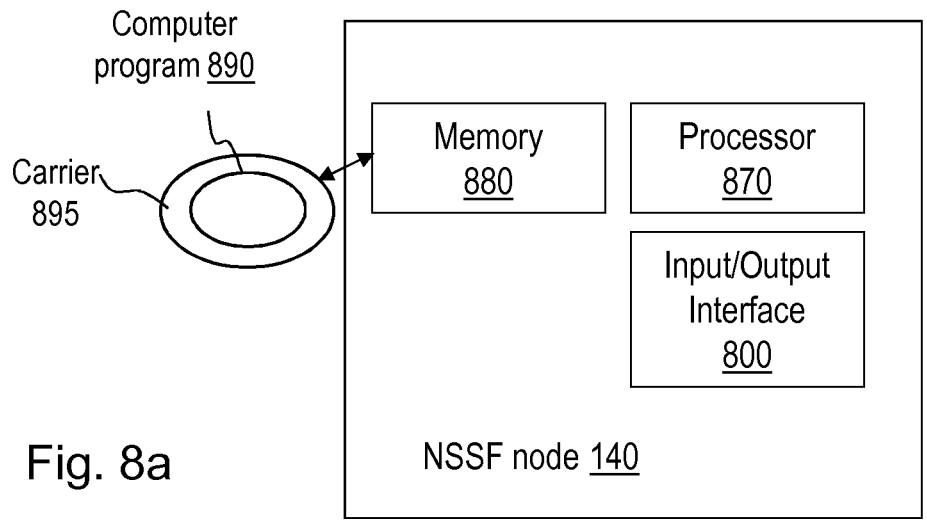
FIGS. 8a and b are schematic block diagrams illustrating embodiments of an NSSF node.
Figure 8B:
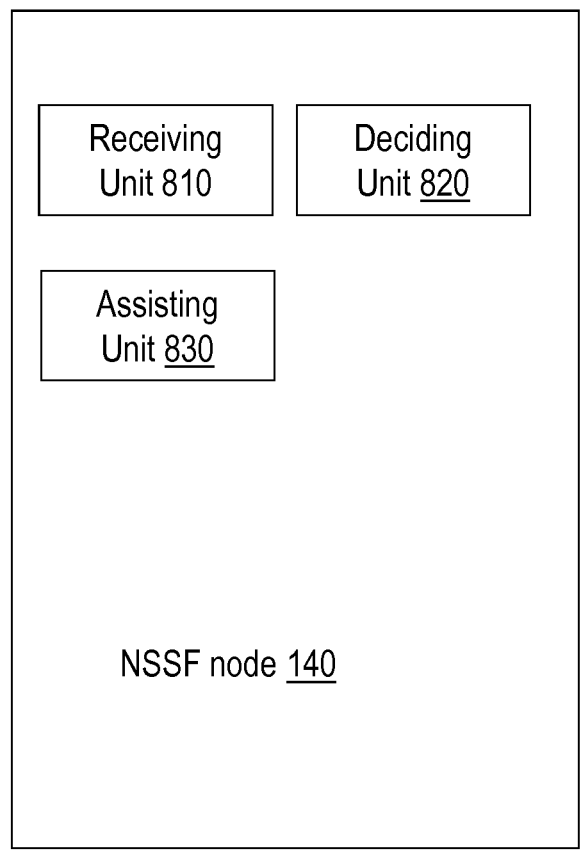

To perform the method actions, the NSSF node 140 may comprise the arrangement depicted in FIGS. 8a and 8b. The NSSF node 140 is configured to assist an AMF node 130 to allocate a target network slice instance 102 to serve a PDU session for a UE 120 in a communications network 100.

The NSSF node 140 may comprise an input and output interface 800 configured to communicate e.g. with network nodes in the communications network 100.

The NSSF node 140 is configured to, e.g. by means of a receiving unit 810 in the NSSF node 130, receive from a NWDAF node 150, an indication adapted to indicate a traffic behaviour of data packets transmitted in the PDU session.

The NSSF node 140 is configured to, e.g. by means of a deciding unit 820 in the NSSF node 140, decide to change an allocation of a first network slice instance 101 that is adapted to serve the PDU session, to the target network slice instance 102, based on policy rules and the received indication adapted to indicate the traffic behavior.

The NSSF node 140 is configured to, e.g. by means of an assisting unit 830 in the NSSF node 140, assist the AMF node 130 to allocate the target network slice instance 102 to serve the PDU session for the UE 120 by transmitting to the AMF node 130, information about the decision to change the allocation of the PDU session for the UE from the first network slice instance 101 to the target network slice instance 102, and an identifier of the target network slice instance 102.

Those skilled in the art will also appreciate that the units in the NSSF node 140 mentioned above may refer to a combination of analog and digital circuits, and/or one or more processors configured with software and/or firmware, e.g. stored in the NSSF node 140 that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

The embodiments herein may be implemented through a respective processor or one or more processors, such as a processor 870 of a processing circuitry in the NSSF node 140 depicted in FIG. 8a, together with respective computer program code for performing the functions and actions of the embodiments herein. The program code mentioned above may also be provided as a computer program product, for instance in the form of a data carrier carrying computer program code for performing the embodiments herein when being loaded into the NSSF node 140. One such carrier may be in the form of a CD ROM disc. It is however feasible with other data carriers such as a memory stick. The computer program code may furthermore be provided as pure program code on a server and downloaded to the NSSF node 140.

The NSSF node 140 may further comprise a memory 880 comprising one or more memory units. The memory comprises instructions executable by the processor in the NSSF node 140.

In some embodiments, a respective computer program 890 comprises instructions, which when executed by the respective at least one processor, cause the at least one processor of the NSSF node 140 to perform the actions above.

In some embodiments, a respective carrier 895 comprises the respective computer program, wherein the carrier is one of an electronic signal, an optical signal, an electromagnetic signal, a magnetic signal, an electric signal, a radio signal, a microwave signal, or a computer-readable storage medium.

Figure 9A:
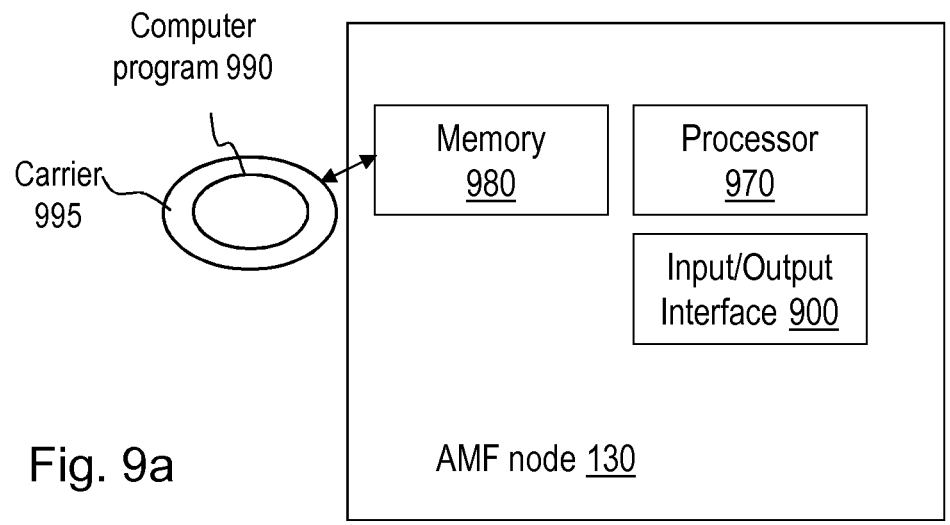
FIGS. 9a and b are schematic block diagrams illustrating embodiments of an AMF node.
Figure 9B:
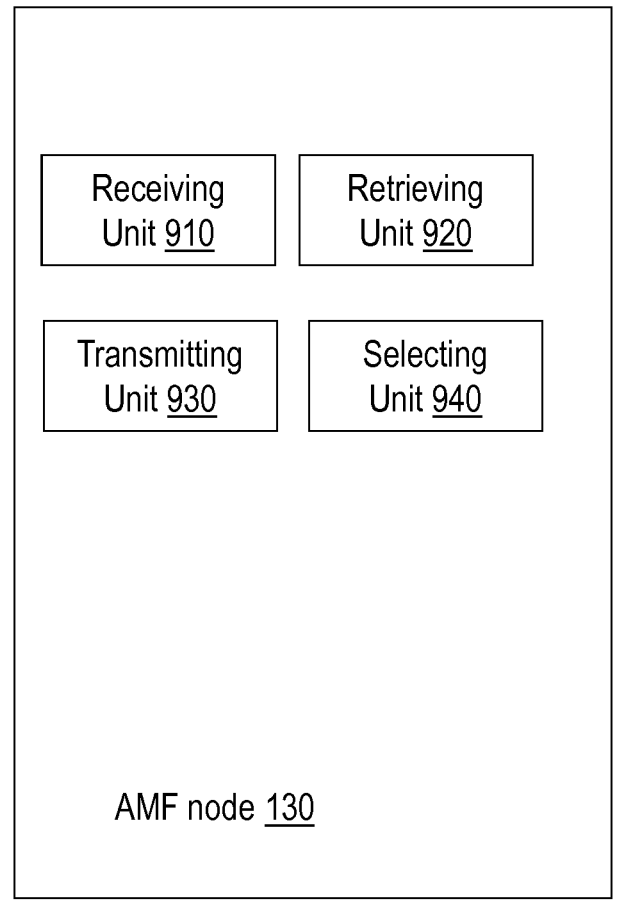

To perform the method actions, the AMF node 130 may comprise the arrangement depicted in FIGS. 9a and 9b. The AMF node 130 is configured to allocate a target network slice instance 102 to serve a PDU session for a UE 120 in a communications network 100. The AMF node 130 may comprise an input and output interface 900 configured to communicate e.g. with network nodes in the communications network 100.

The AMF node 130 is configured to, e.g. by means of a receiving unit 910 in the AMF node 130, receive from a NSSF node 140 information about a decision to change an allocation of a first network slice instance 101, which is adapted to serve the PDU session, to the target network slice instance 102, and an identifier of the target network slice instance 102.

The AMF node 130 is configured to, e.g. by means of a retrieving unit 920 in the AMF node 130, retrieve from a first Session Management Function, SMF, node 151 of the first network slice instance 101, a UE context adapted to be related to the UE 120 and the PDU session.

The AMF node 130 is configured to, e.g. by means of a transmitting unit 930 in the AMF node 130, transmit towards a target SMF node 152 of the target network slice instance 102, information about the retrieved UE context and Access Network, AN, tunnel information adapted to be used for the PDU session.

The AMF node 130 is configured to, e.g. by means of the receiving unit 910 in the AMF node 130, receive from the target SMF node 152, target Core Network, CN, tunnel information adapted to be used for the PDU session.

The AMF node 130 is configured to, e.g. by means of the transmitting unit 930 in the AMF node 130, allocate the target network slice instance (102) to route data flows pertaining to the PDU session by transmitting towards an Access Network (AN) node the information about the target CN tunnel adapted to be used for the PDU session.

According to some embodiments, the AMF node 130 is further configured to e.g. by means of a selecting unit 940 in the AMF node 130, select the target SMF node 152 of the target network slice instance 102.

Those skilled in the art will also appreciate that the units in the AMF node 130 mentioned above may refer to a combination of analog and digital circuits, and/or one or more processors configured with software and/or firmware, e.g. stored in the AMF node 130 that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

The embodiments herein may be implemented through a respective processor or one or more processors, such as a processor 970 of a processing circuitry in the AMF node 130 depicted in FIG. 9a, together with respective computer program code for performing the functions and actions of the embodiments herein. The program code mentioned above may also be provided as a computer program product, for instance in the form of a data carrier carrying computer program code for performing the embodiments herein when being loaded into the AMF node 130. One such carrier may be in the form of a CD ROM disc. It is however feasible with other data carriers such as a memory stick. The computer program code may furthermore be provided as pure program code on a server and downloaded to the AMF node 130.

The AMF node 130 may further comprise a memory 980 comprising one or more memory units. The memory comprises instructions executable by the processor in the AMF node 130.

In some embodiments, a respective computer program 990 comprises instructions, which when executed by the respective at least one processor, cause the at least one processor of the AMF node 130 to perform the actions above.

In some embodiments, a respective carrier 995 comprises the respective computer program, wherein the carrier is one of an electronic signal, an optical signal, an electromagnetic signal, a magnetic signal, an electric signal, a radio signal, a microwave signal, or a computer-readable storage medium.

Figure 10A:
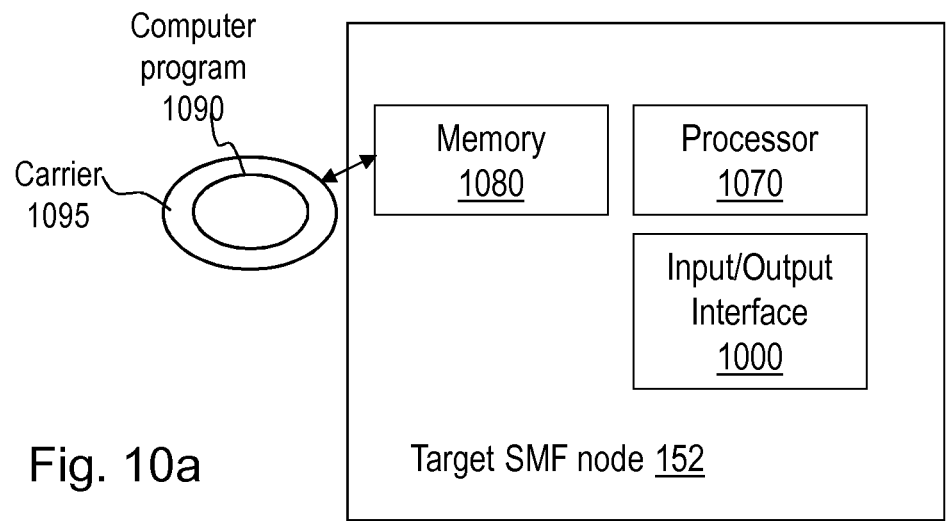
FIGS. 10a and b are schematic block diagrams illustrating embodiments of an SMF node.
Figure 10B:
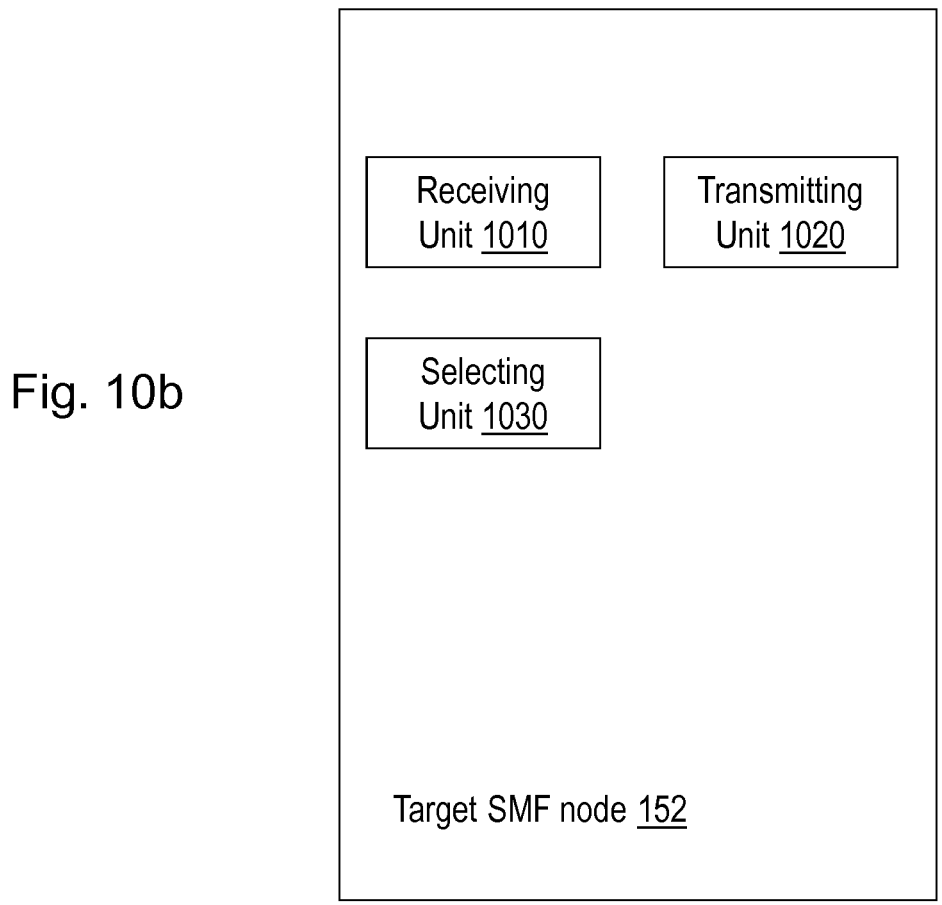

To perform the method actions, the target SMF node 152 may comprise the arrangement depicted in FIGS. 10a and 10b. The target SMF node 152 is configured to assist an AMF node 130 to allocate a target network slice instance 102 to serve a PDU session for a UE 120 in a communications network 100.

The target SMF node 152 may comprise an input and output interface 1000 configured to communicate e.g. with network nodes in the communications network 100.

The target SMF node 152 is configured to, e.g. by means of a receiving unit 1010 in the target SMF node 152, receive, from the AMF node 130, information about a UE context related to the UE 120 and AN tunnel information adapted to be used for the PDU session.

The target SMF node 152 is configured to, e.g. by means of a transmitting unit 1020 in the target SMF node 152, transmit, towards a target UPF node 162 of the target network slice instance 102, the received AN tunnel information adapted to be used for the PDU session.

The target SMF node 152 is configured to, e.g. by means of the receiving unit 1010 in the target SMF node 152, receive, from the target UPF node 162, target Core Network, CN, tunnel information adapted to be used for the PDU session.

The target SMF node 152 is configured to, e.g. by means of the transmitting unit 1020 in the target SMF node 152, transmit, towards the AMF node 130, the received target CN tunnel information adapted to be used for the PDU session.

According to some embodiments, the target SMF node 152 is further configured to e.g. by means of a selecting unit 1030 in the target SMF node 152, select the target UPF node 162 of the target network slice instance 102.

Those skilled in the art will also appreciate that the units in the target SMF node 152 mentioned above may refer to a combination of analog and digital circuits, and/or one or more processors configured with software and/or firmware, e.g. stored in the target SMF node 152 that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

The embodiments herein may be implemented through a respective processor or one or more processors, such as a processor 1070 of a processing circuitry in the target SMF node 152 depicted in FIG. 10*a*, together with respective computer program code for performing the functions and actions of the embodiments herein. The program code mentioned above may also be provided as a computer program product, for instance in the form of a data carrier carrying computer program code for performing the embodiments herein when being loaded into the target SMF node 152. One such carrier may be in the form of a CD ROM disc. It is however feasible with other data carriers such as a memory stick. The computer program code may furthermore be provided as pure program code on a server and downloaded to the target SMF node 152.

The target SMF node 152 may further comprise a memory 1080 comprising one or more memory units. The memory comprises instructions executable by the processor in the target SMF node 152.

In some embodiments, a respective computer program 1090 comprises instructions, which when executed by the respective at least one processor, cause the at least one processor of the target SMF node 152 to perform the actions above.

In some embodiments, a respective carrier 1095 comprises the respective computer program, wherein the carrier is one of an electronic signal, an optical signal, an electromagnetic signal, a magnetic signal, an electric signal, a radio signal, a microwave signal, or a computer-readable storage medium.

Further Extensions and Variations

Figure 11:
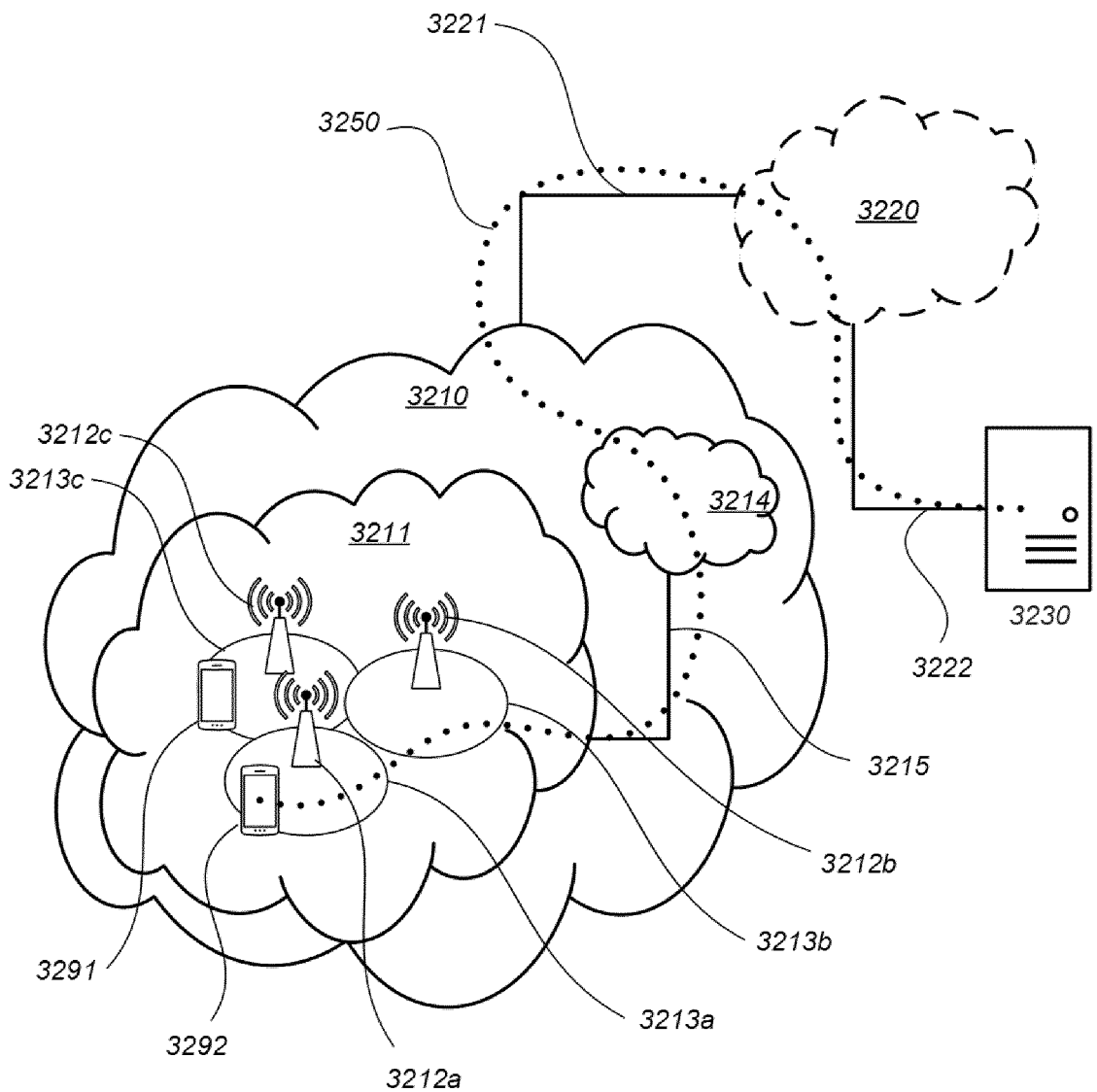
FIG. 11 schematically illustrates a telecommunication network connected via an intermediate network to a host computer.

With reference to FIG. 11, in accordance with an embodiment, a communication system includes a telecommunication network 3210 such as the wireless communications network 100, e.g. a NR network, such as a 3GPP-type cellular network, which comprises an access network 3211, such as a radio access network, and a core network 3214. The access network 3211 comprises a plurality of base stations 3212*a*, 3212*b*, 3212*c*, such as the network node 110, access nodes, AP STAs NBs, eNBs, gNBs or other types of wireless access points, each defining a corresponding coverage area 3213*a*, 3213*b*, 3213*c*. Each base station 3212*a*, 3212*b*, 3212*c* is connectable to the core network 3214 over a wired or wireless connection 3215. A first user equipment (UE) e.g. the UE 120 such as a Non-AP STA 3291 located in coverage area 3213*c* is configured to wirelessly connect to, or be paged by, the corresponding base station 3212*c*. A second UE 3292 e.g. the wireless device 122 such as a Non-AP STA in coverage area 3213*a* is wirelessly connectable to the corresponding base station 3212*a*. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 11 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 12. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 12) served by the base station 3320. The communication interface 3326 may be configured to facilitate a connection 3360 to the host computer 3310. The connection 3360 may be direct or it may pass through a core network (not shown in FIG. 12) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides. It is noted that the host computer 3310, base station 3320 and UE 3330 illustrated in FIG. 12 may be identical to the host computer 3230, one of the base stations 3212a, 3212b, 3212c and one of the UEs 3291, 3292 of FIG. 11, respectively. This is to say, the inner workings of these entities may be as shown in FIG. 12 and independently, the surrounding network topology may be that of FIG. 11.

Figure 12:
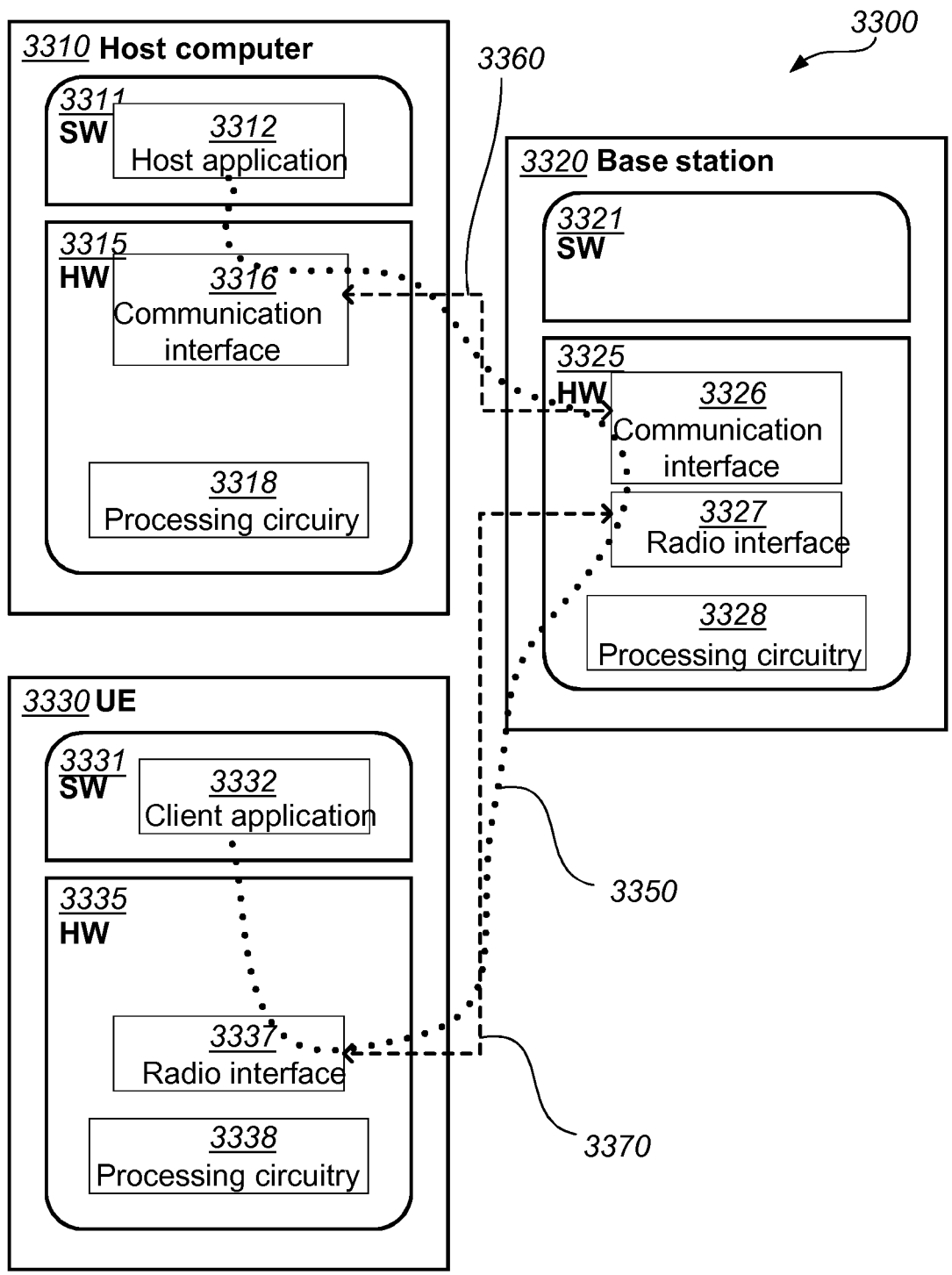
FIG. 12 is a generalized block diagram of a host computer communicating via a base station with a user equipment over a partially wireless connection.

In FIG. 12, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the data rate, latency, power consumption and thereby provide benefits such as user waiting time, relaxed restriction on file size, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figures 13, 14:
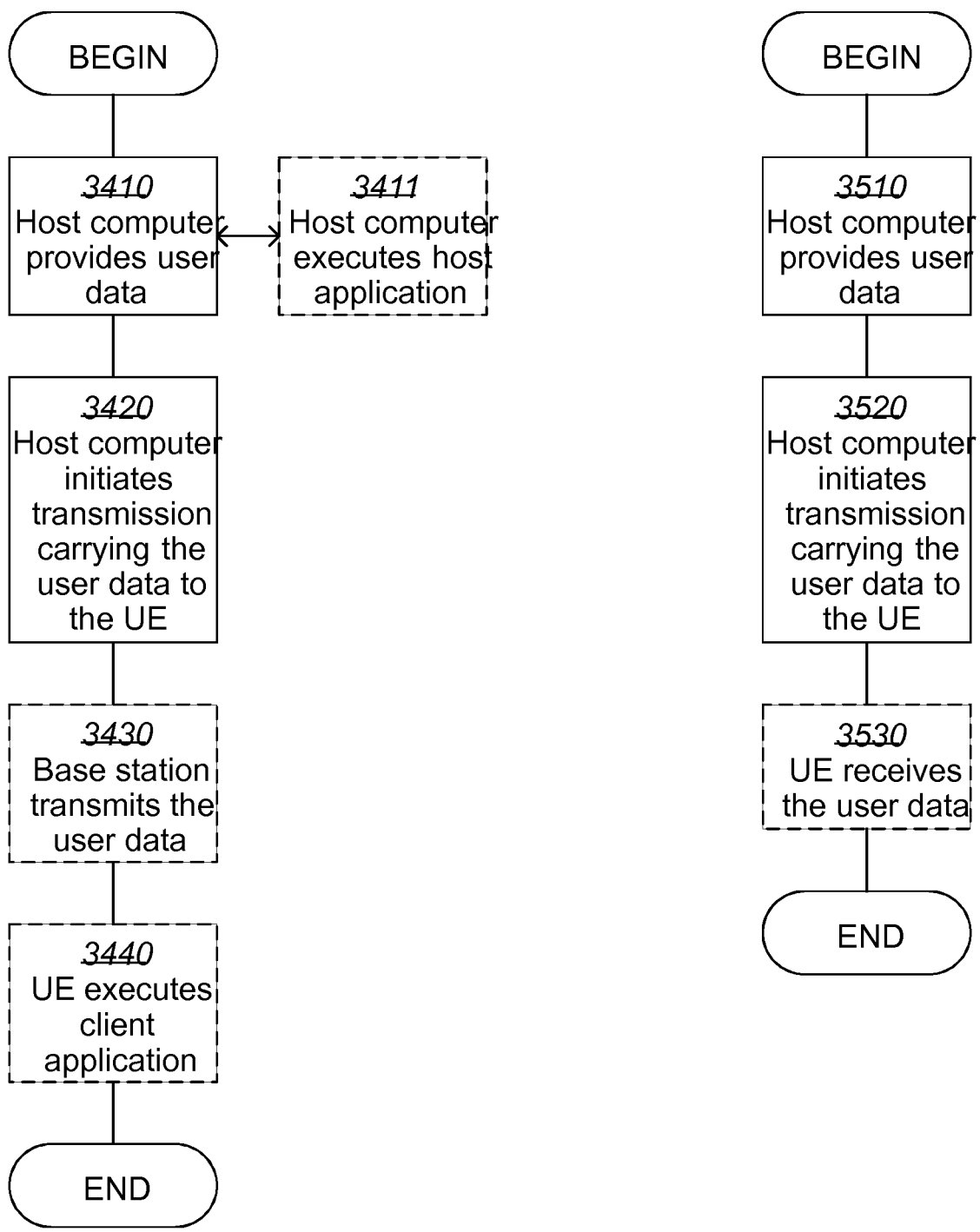

FIG. 13 is a flowchart illustrating a method implemented in a communication system, in accordance with one embodiment. The communication system includes a host computer, a base station such as a AP STA, and a UE such as a Non-AP STA which may be those described with reference to FIG. 11 and FIG. 12. For simplicity of the present disclosure, only drawing references to FIG. 13 will be included in this section. In a first action 3410 of the method, the host computer provides user data. In an optional subaction 3411 of the first action 3410, the host computer provides the user data by executing a host application. In a second action 3420, the host computer initiates a transmission carrying the user data to the UE. In an optional third action 3430, the base station transmits to the UE the user data which was carried in the transmission that the host computer initiated, in accordance with the teachings of the embodiments described throughout this disclosure. In an optional fourth action 3440, the UE executes a client application associated with the host application executed by the host computer.

FIG. 14 is a flowchart illustrating a method implemented in a communication system, in accordance with one embodiment. The communication system includes a host computer, a base station such as a AP STA, and a UE such as a Non-AP STA which may be those described with reference to FIG. 11 and FIG. 12. For simplicity of the present disclosure, only drawing references to FIG. 14 will be included in this section. In a first action 3510 of the method, the host computer provides user data. In an optional subaction (not shown) the host computer provides the user data by executing a host application. In a second action 3520, the host computer initiates a transmission carrying the user data to the UE. The transmission may pass via the base station, in accordance with the teachings of the embodiments described throughout this disclosure. In an optional third action 3530, the UE receives the user data carried in the transmission.

FIG. 15 is a flowchart illustrating a method implemented in a communication system, in accordance with one embodiment. The communication system includes a host computer, a base station such as a AP STA, and a UE such as a Non-AP STA which may be those described with reference to FIG. 11 and FIG. 12. For simplicity of the present disclosure, only drawing references to FIG. 15 will be included in this section. In an optional first action 3610 of the method, the UE receives input data provided by the host computer. Additionally or alternatively, in an optional second action 3620, the UE provides user data. In an optional subaction 3621 of the second action 3620, the UE provides the user data by executing a client application. In a further optional subaction 3611 of the first action 3610, the UE executes a client application which provides the user data in reaction to the received input data provided by the host computer. In providing the user data, the executed client application may further consider user input received from the user. Regardless of the specific manner in which the user data was provided, the UE initiates, in an optional third subaction 3630, transmission of the user data to the host computer. In a fourth action 3640 of the method, the host computer receives the user data transmitted from the UE, in accordance with the teachings of the embodiments described throughout this disclosure.

FIG. 16 is a flowchart illustrating a method implemented in a communication system, in accordance with one embodiment. The communication system includes a host computer, a base station such as a AP STA, and a UE such as a Non-AP STA which may be those described with reference to FIG. 11 and FIG. 12. For simplicity of the present disclosure, only drawing references to FIG. 16 will be included in this section. In an optional first action 3710 of the method, in accordance with the teachings of the embodiments described throughout this disclosure, the base station receives user data from the UE. In an optional second action 3720, the base station initiates transmission of the received user data to the host computer. In a third action 3730, the host computer receives the user data carried in the transmission initiated by the base station.

When using the word "comprise" or "comprising" it shall be interpreted as non-limiting, i.e. meaning "consist at least of".

The embodiments herein are not limited to the above described preferred embodiments. Various alternatives, modifications and equivalents may be used.

ABBREVIATIONS

Abbreviation Explanation
AMF Access and Mobility Management Function
DPI Deep Packet Inspection
DN Data Network
eMBB Enhanced Mobile Broadband
IoT Internet of Things
MIoT Massive IoT
NG-RAN Next Generation RAN
NS Network Slice
NSSF Network Slice Selection Function
NWDAF Network Data Analytics Function
PDU Protocol Data Unit
RAN Radio Access Network
SMF Session Management Function
SUPI Subscription Permanent Identifier
TEID Tunnel Endpoint Identifier
UE User Equipment
UPF User Plane Function
URLLC Ultra-Reliable and Low Latency Communication

The invention claimed is:

1. A method performed by an Access and mobility Management Function, AMF, node for allocating a target network slice instance to serve a Protocol Data Unit, PDU, session for a User Equipment, UE, in a communications network, the method comprising:
    receiving, from a Network Slice Selection Function, NSSF, node, information about a decision to change an allocation of a first network slice instance that is serving the PDU session for the UE to the target network slice instance, and an identifier of the target network slice instance,
    retrieving, from a first Session Management Function, SMF, node of the first network slice instance, a UE context related to the UE and the PDU session,
    transmitting, towards a target SMF node of the target network slice instance, information about the retrieved UE context and Access Network, AN, tunnel information to be used for the PDU session,
    receiving from the target SMF node, target Core Network, CN, tunnel information to be used for the PDU session,
    allocating the target network slice instance to route data flows pertaining to the PDU session by transmitting towards an Access Network, AN, node, the target CN tunnel information to be used for the PDU session.

2. The method according to claim 1, further comprising: selecting the target SMF node of the target network slice instance.

3. The method according to claim 1, wherein the AN tunnel information to be used for the PDU session relates to an address of the AN tunnel comprising a Tunnel Endpoint Identifier, TEID, and an IP address and an IP port number that is used by the AN node for the PDU Session.

4. The method according to claim 1, wherein the target CN tunnel information to be used for the PDU session relates to an address of the CN tunnel comprising a Tunnel Endpoint Identifier, TEID, an IP address and an IP port number to be used by a target User Plane Function, UPF, node (162) of the target network slice instance for the PDU Session.

5. The method according to claim 1, wherein the information transmitted towards the AN node further comprises information about which data flows of the PDU Session should be routed through the target CN tunnel.

6. The method according to claim 1, wherein the information transmitted towards a target SMF node of the target network slice instance , further comprises information about which data flows of the PDU Session that should be routed through the target AN tunnel.

7. The method according to claim 1, further comprising: transmitting a response to the NSSF node comprising an acknowledgement of the decision to change an allocation of the first network slice instance to the target network slice instance.

8. A computer program product comprising a non-transitory computer readable medium storing computer readable program code, the computer readable program code operable, when executed by processing circuitry proeessor to perform actions according to claim 1.

9. A Network Slice Selection Function, NSSF, node configured to assist an Access and mobility Management Function, AMF, node to allocate a target network slice instance to serve a Protocol Data Unit, PDU, session for a User Equipment, UE, in a communications network, wherein the NSSF node further is configured to:
- receive from a Network Data Analytics Function, NWDAF, node an indication of a traffic behaviour of data packets transmitted in the PDU session,
- decide to change an allocation of a first network slice instance that is adapted to serve the PDU session, to the target network slice instance, based on policy rules and the received indication adapted to indicate the traffic behaviour,
- assist the AMF node to allocate the target network slice instance to serve the PDU session for the UE by transmitting to the AMF node, information about the decision to change the allocation of the PDU session for the UE from the first network slice instance to the target network slice instance, and an identifier of the target network slice instance.

10. A method performed by a Network Slice Selection Function, NSSF, node for assisting an Access and mobility Management Function, AMF, node to allocate a target network slice instance to serve a Protocol Data Unit, PDU, session for a User Equipment, UE, in a communications network, the method comprising:
- receiving, from a Network Data Analytics Function, NWDAF, node, an indication indicating a traffic behaviour of data packets transmitted in the PDU session,
- deciding to change an allocation of a first network slice instance that is serving the PDU session, to the target network slice instance, based on policy rules and the received indication indicating the traffic behaviour,
- assisting the AMF node to allocate the target network slice instance to serve the PDU session for the UE by transmitting to the AMF node, information about the decision to change the allocation of the PDU session for the UE from the first network slice instance to the target network slice instance, and an identifier of the target network slice instance.

11. A computer program product comprising a non-transitory computer readable medium storing computer readable program code, the computer readable program code operable, when executed by processing circuitry to perform actions according to claim 10.

12. A method performed by a target Session Management Function, SMF, node of a target network slice instance for assisting an Access and mobility Management Function, AMF, node to allocate the target network slice instance to serve a Protocol Data Unit, PDU, session for a User Equipment, UE, in a communications network, the method comprising:
- receiving, from the AMF node, information about a UE context related to the UE and Access Network, AN, tunnel information to be used for the PDU session,
- transmitting, towards a target User Plane Function, UPF, node of the target network slice instance, the received AN tunnel information to be used for the PDU session,
- receiving, from the target UPF node, target Core Network, CN, tunnel information to be used for the PDU session,
- transmitting, towards the AMF node, the received target CN tunnel information to be used for the PDU session.

13. The method according to claim 12, further comprising:
- selecting the target UPF node of the target network slice instance.

14. A computer program product comprising a non-transitory computer readable medium storing computer readable program code, the computer readable program code operable, when executed by processing circuitry to perform actions according to claim 12.

15. A target Session Management Function, SMF, node of a target network slice instance, the SMF node configured to assist an Access and mobility Management Function, AMF, node to allocate the target network slice instance to serve a Protocol Data Unit, PDU, session for a User Equipment, UE, in a communications network, wherein the SMF node further is configured to:
- receive, from the AMF node, information about a UE context related to the UE and Access Network, AN, tunnel information adapted to be used for the PDU session,
- transmit, towards a target User Plane Function, UPF, node of the target network slice instance, the received AN tunnel information adapted to be used for the PDU session,
- receive, from the target UPF node, target Core Network, CN, tunnel information adapted to be used for the PDU session,
- transmit, towards the AMF node, the received target CN tunnel information adapted to be used for the PDU session.

16. The SMF node according to claim 15, is further configured to:
- select the target UPF node of the target network slice instance.

17. An Access and mobility Management Function, AMF, node configured to allocate a target network slice instance to serve a Protocol Data Unit, PDU, session for a User Equipment, UE, in a communications network, wherein the AMF further is configured to:
- receive from a Network Slice Selection Function, NSSF, node, information about a decision to change an allocation of a first network slice instance, which is adapted to serve the PDU session, to the target network slice instance, and an identifier of the target network slice instance,
- retrieve from a first Session Management Function, SMF, node of the first network slice instance, a UE context adapted to be related to the UE and the PDU session,
- transmit towards a target SMF node of the target network slice instance, information about the retrieved UE context and an Access Network, AN, tunnel information adapted to be used for the PDU session,
- receive from the target SMF node, target Core Network, CN, tunnel information adapted to be used for the PDU session,
- allocate the target network slice instance to route data flows pertaining to the PDU session by transmitting towards an Access Network, AN, node the target CN tunnel information adapted to be used for the PDU session.

18. The AMF node according to claim 17, is further configured to:
- select the target SMF node of the target network slice instance.

19. The AMF node according to claim 17, wherein the AN tunnel information to be used for the PDU session, is adapted to relate to an address of the AN tunnel comprising a Tunnel Endpoint Identifier, TEID, and an IP address and an IP port number to be used by the AN node for the PDU Session.

20. The AMF node according to claim 17, wherein the target CN tunnel information to be used for the PDU session is adapted to relate to an address of the CN tunnel comprising a Tunnel Endpoint Identifier, TEID, an IP address and an IP port number to be used by a target User Plane Function, UPF, node of the target network slice instance for the PDU Session.

21. The AMF node according to claim 17, wherein the information transmitted towards the AN node is further adapted to comprise information about which data flows of the PDU Session should be routed through the target CN tunnel.

22. The AMF node according to claim 17, wherein the information transmitted towards a target SMF node of the target network slice instance, is further adapted to comprise information about which data flows of the PDU Session should be routed through the target AN tunnel.

23. The AMF node according to claim 17, is further configured to:
  transmit a response to the NSSF node adapted to comprise an acknowledgement of the decision to change an allocation of the first network slice instance to the target network slice instance.

\* \* \* \* \*